US012544903B2

(12) United States Patent
Perelli et al.

(10) Patent No.: US 12,544,903 B2
(45) Date of Patent: Feb. 10, 2026

(54) APPARATUS FOR CLEANING A CONTROLLED AND REGULATED EQUIPMENT

(71) Applicant: Porex Cleanroom Products Inc., Chicopee, MA (US)

(72) Inventors: Thomas Perelli, Durham, NC (US); Brad Forrest, Cary, NC (US); Sean Imlay, Atlanta, GA (US); Ying Zhang, Decatur, GA (US)

(73) Assignee: Porex Cleanroom Products Inc., Chicopee, MA (US)

( * ) Notice: Subject to any disclaimer, the term of this patent is extended or adjusted under 35 U.S.C. 154(b) by 676 days.

(21) Appl. No.: 17/954,732

(22) Filed: Sep. 28, 2022

(65) Prior Publication Data

US 2023/0100294 A1 Mar. 30, 2023

Related U.S. Application Data

(60) Provisional application No. 63/334,627, filed on Apr. 25, 2022, provisional application No. 63/249,307, filed on Sep. 28, 2021.

(51) Int. Cl.
*B25G 1/10* (2006.01)
*B08B 1/14* (2024.01)
(Continued)

(52) U.S. Cl.
CPC ................ *B25G 1/102* (2013.01); *B08B 1/14* (2024.01); *B08B 1/143* (2024.01); *B08B 1/30* (2024.01);
(Continued)

(58) Field of Classification Search
CPC .......... B65D 25/04; B25G 1/04; B25G 1/102; B08B 13/00; B08B 1/143; B08B 1/14;
(Continued)

(56) References Cited

U.S. PATENT DOCUMENTS 8,397,338 B2 3/2013 Dihn
10,390,646 B1 * 8/2019 Cox ...................... A47G 25/90
(Continued)

FOREIGN PATENT DOCUMENTS

JP 2006-000541 A1 1/2006
WO 2006-064330 A1 6/2006

OTHER PUBLICATIONS

International Search Report and Written Opinion issued in PCT/US2022/045025 dated Jan. 20, 2023; 10 pgs.

*Primary Examiner* — Katina N. Henson
(74) *Attorney, Agent, or Firm* — Vedder Price P.C.

(57) ABSTRACT

An apparatus for cleaning a controlled and regulated equipment, wherein the apparatus comprises a tool handle including a first handle portion removably connected to a second handle portion and a tool head frame pivotably connected to the second handle portion. The tool head frame further comprises a leading edge opposite a trailing edge and a first side edge opposite a parallel second side edge disposed between the leading edge and the trailing edge respectively wherein the leading edge and the trailing edge are non-parallel to each other—forming a trapezoidal shaped tool head frame. A tray including at least one compartment, a pad assembly and a cleaning solution wherein the pad assembly and the cleaning solution are disposed in the at least one compartment is provided. The pad assembly is movable within the at least one compartment between a first position and a second position so that the tool head frame is hands-free attachable to the pad assembly in the first position or second position and the tool head frame is hands-free detachable from the pad assembly in the second position.

10 Claims, 17 Drawing Sheets

(51) Int. Cl.
*B08B 1/30* (2024.01)
*B08B 13/00* (2006.01)
*B25G 1/04* (2006.01)
*B65D 25/04* (2006.01)

(52) U.S. Cl.
CPC ................ *B08B 13/00* (2013.01); *B25G 1/04* (2013.01); *B65D 25/04* (2013.01)

(58) Field of Classification Search
CPC ........ B08B 1/30; A47L 13/256; A47L 13/255; A47L 13/20; A47L 13/254
USPC ........................................................ 15/104.94
See application file for complete search history.

(56) References Cited

U.S. PATENT DOCUMENTS

| | | | | |
|---|---|---|---|---|
| 10,973,388 | B1 * | 4/2021 | Feeny | A47L 13/253 |
| 2013/0340187 | A1 * | 12/2013 | Bober | A47L 13/256<br>15/147.1 |
| 2017/0258287 | A1 * | 9/2017 | Shin | A47L 13/255 |
| 2019/0365186 | A1 | 12/2019 | Buckley et al. | |
| 2022/0142444 | A1 * | 5/2022 | Xie | A47L 11/4011 |

* cited by examiner

APPARATUS FOR CLEANING A CONTROLLED AND REGULATED EQUIPMENT

CROSS-REFERENCE TO RELATED APPLICATION

This Application claims the benefit of and priority to U.S. Provisional Application No. 63/249,307, filed Sep. 28, 2021, and U.S. Provisional Application No. 63/334,627, filed Apr. 25, 2022, the contents of which are hereby incorporated by reference.

FIELD OF DISCLOSURE

The present disclosure generally relates to an apparatus, system and method of using a lightweight and maneuverable cleaning tool having an ergonomic and asymmetric tool design comprising a tool head configured with a hands-free means of attachment/detachment of a pad assembly for efficient cleaning of controlled and regulated equipment.

BACKGROUND

Isolators are sophisticated pieces of equipment designed primarily to protect one's products from inadvertent contamination. Isolators are used to protect health care workers/operators of the equipment, as well as patients. Specifically, the glove-box compounding aseptic isolators often provide a positive pressure environment for the safe compounding of sterile preparations. For instance, any drug compounding and/or titrations within the isolator must be effective, stable and safe, making the isolator equipment environment critical for success.

Isolators require regular cleaning and disinfection to maintain and comply with microbial grade requirements. Cleaning tools used to clean and disinfect isolators have a critical job to prevent cross-contamination with both compounding of drugs as well as contamination to the isolator operator. The same tools are used to clean small spaces with limited access and many hard-to-reach areas that are generally found during cleaning of compound isolators, biological safety cabinets, laminar flow hoods and other mini-environments, all of which are critical to the quality and purity of compounding products.

One key disadvantage in prior art cleaning tools is that they require significant fine motor skills to attach and detach pads from the frame. This is very difficult and cumbersome with heavily gloved hands in small spaces and long tool handles, making cleaning operations with such tools highly inefficient. This also presents a potential cross-contamination risk, as operators have to touch the soiled pads when removing them from the frame.

Prior art cleaning tools do not provide a solution to store clean and soiled pads within the controlled and regulated environments (e.g., isolator equipment and other similar equipment). Based on standard operating procedures, when multiple pads are required to clean the equipment and the entire cleaning operation has to be completed within the equipment, prior art cleaning tools do not address how to store the clean pads and how to manage the soiled pads after use. Finally, currently available cleaning tools lack the needed flexibility, maneuverability and adaptability to access the hard-to-reach detail areas of controlled and regulated environments (e.g., isolator equipment). Further, prior art tool handle lengths make it difficult to clean or reach certain surfaces (irrespective of whether the cleaning surfaces are closer to or farther away from the reach of the operator) within an enclosed environment, thereby limiting maneuverability of the tools during the cleaning operation.

There is clearly a market need for a simple and efficient means of cleaning controlled and regulated environments (e.g., isolator equipment and other similar equipment) in the form of a system cleaning solution with a turnkey disinfecting process along with optimum prevention of cross-contamination. In other words, there is a dearth of cleaning tools—specifically tools configured with integrated packaging overcoming the disadvantages and shortcomings of the prior art tools—that make the overall cleaning process more efficient and provide a total system solution rather than a single component solution as found in the prior art isolator cleaning systems.

The present disclosure is directed to a system, apparatus and method comprising an improved lightweight cleaning tool having an ergonomic form factor and providing efficient cleaning of controlled and regulated environments (e.g., isolator equipment and other similar equipment) while preventing cross-contamination of the tool. More particularly, the present disclosure is directed to an improved isolator cleaning system, apparatus and method—a novel and uniquely configured isolator cleaning tool that provides significant performance and efficiency improvement from currently available prior art cleaning tools—providing a complete system solution via integrating the tool and its associated pad packaging synergistically while overcoming prior art shortcomings and disadvantages related to the potential cross-contamination.

BRIEF SUMMARY OF THE DISCLOSURE

Embodiments disclosed in the present disclosure provide a system, apparatus and method of cleaning a controlled and regulated environment (e.g., isolator equipment and other similar equipment).

A comprehensive isolator cleaning system, apparatus and method comprises an improved lightweight isolator cleaning tool ("tool" or "ICT") used in combination with a packaging tray, the tool having a linearly extending and adjustable tool handle of a certain length. The lightweight and durable cleaning tool provides efficient cleaning of compound isolators, biological safety cabinets, laminar flow hoods and other mini-environments that are critical to the quality and purity of compounded products. The tool is maneuverable within the isolator to clean all surfaces and underneath most hardware with a secure and comfortable one- and two-handed grip. The grip is sized to accommodate a certain percentile of male and female users; the tool's unique form and configuration are designed for easy accessibility of hard-to-reach detail areas while providing the appropriate level of fine motor manipulations with gloved hands during the cleaning operation.

In an aspect of the present disclosure, a system, apparatus and method for cleaning controlled and regulated equipment comprises a tool having (1) a tool handle including a removable first handle portion connected to a second handle portion; (2) a pivoting tool head frame connectable to the second handle portion. The tool head frame includes a leading edge opposite a trailing edge and a first side edge opposite a parallel second side edge disposed between the leading and the trailing edge—the leading edge and the trailing edge are non-parallel to each other and form a trapezoidal shaped tool head frame. The first handle portion further includes an ergonomic grip portion and the second handle portion includes an engagement grip portion—the first handle portion and the second handle portion are removably connected to each other via a quick-release mechanism (which can be configured as a molded-in spring clip or a plurality of polymagnets). In the depicted embodiment, the tool head frame further comprises (1) a yoke attachment disposed offset from the center of the tool head frame and centrally located between the first side edge and the second edge of the frame in order to provide additional access during cleaning of the equipment; and/or (2) an integrated hinge mount disposed offset from the center of the tool head frame and centrally located between the first side edge and the second edge of the frame in order to provide additional access and stability during cleaning of the equipment.

In another aspect of the present disclosure, a system, apparatus and method of cleaning a controlled and regulated equipment comprises a tray (also known as the packaging tray) including at least one compartment, a pad assembly and a cleaning solution. The pad assembly and the cleaning solution are disposed in the at least one compartment of the tray. The compartment comprises a first edge opposite a second edge and a first side opposite a parallel second side disposed between the first and the second edge respectively. The first edge and the second edge are non-parallel to each other and configured to complimentarily dispose a tool head frame therein. In various other aspects of the present disclosure, the tray comprises a plurality of compartments, wherein each compartment is isolated from the other in order to allow the pad assembly to be positioned for easy attachment and detachment to the tool head.

In another aspect of the present disclosure, the compartment of the packaging tray includes a projection extending from a wall of the compartment—the projection configured to overlap an edge of the pad assembly when disposed in the second position in order to retain the pad assembly within the compartment when the pad assembly is detached from the tool head frame. The pad assembly comprises (1) a pad; (2) a backer having opposite curved longitudinal edges and disposed in the pad. The backer has a partial cylinder configuration with a pre-determined radius of curvature configured to be pressed and snap-fitted into the pad assembly during cleaning of the equipment. Each of the leading edge and the trailing edge of the tool head frame has a partial cylinder configuration with a pre-determined radius of curvature configured to concentrically align and snap into the opposite curved longitudinal edges of the backer of the pad assembly.

In yet another aspect of the present disclosure, the pad assembly is movable within the compartment between a first position and a second position so that the tool head frame is hands-free attachable to the pad assembly in the first position or second position, and the tool head frame is hands-free detachable from the pad assembly in the second position. As disclosed herein, the compartment further includes a projection extending from a wall of the compartment so as to overlap an edge of the pad assembly when disposed in the second position in order to retain the pad assembly within the compartment when the pad assembly is detached from the tool head frame. The system disclosed herein further comprises means for providing a precise amount of cleaning solution within the compartment in order to provide accurate saturation and consistent moisture level for the pad within the pad assembly.

In another aspect of the present disclosure, a method for cleaning a controlled and regulated equipment is provided. The method comprises the steps of (a) forming a tool handle by removably connecting a first handle portion to a second handle portion; (b) pivotably connecting a tool head frame to the second handle portion—the tool head frame comprising a leading edge opposite a trailing edge and a first side edge opposite a parallel second side edge disposed between the leading and the trailing edge respectively, wherein the leading edge and the trailing edge are non-parallel to each other (thereby forming a trapezoidal-shaped head frame); (c) positioning the tool head frame in proximity to a tray having at least one compartment, a pad assembly and a cleaning solution, wherein the pad assembly and the cleaning solution are disposed in at least one compartment; (d) configuring the pad assembly to be movable within at least one compartment between a first position and a second position; and (e) attaching the tool head hands-free to the pad assembly in the first position or second position and detaching the tool head hands-free from the pad assembly in the second position. The method disclosed herein, further comprises the step of providing a precise amount of cleaning solution within the compartment for accurate saturation and consistent moisture level for the pad within the pad assembly.

The isolator cleaning system, apparatus and methods disclosed herein prevent cross-contamination to the operator while providing ergonomic and asymmetric functionality—an advantageous ergonomic anatomical posture for the user during cleaning—a relatively straight, balanced and relaxed alignment of the wrists, arms and body during the cleaning operation. The tool head is further configured with a means to attach to the pad without a user's physical contact—providing a hands-free pad attachment mechanism—the tool's asymmetrical design optimized for efficient surface cleaning of controlled and regulated equipment (e.g., an isolator). Various other shapes of tool head frame can be used, including but not limited to rectangular or triangular-shaped tool head frame. In addition, the length of the tool handle can be adjusted during the cleaning operation.

In another aspect of the present disclosure, the short and adjustable tool handle length of the cleaning tool allows steam to sterilize all surfaces (both visible and hidden surfaces), and it is 100 percent autoclave cleanable. Other shaped tool head frames—for example, a long and narrow triangular-shaped tool head frame (designed to access between hard-to-reach hardware obstacles and certain depth for cleaning) can also be configured with grasping means in the form of grips designed for improved comfort and safe ergonomic handling as well as reducing any fatigue and/or long-term muscle/joint injuries during the cleaning operation. The easily maneuverable frame head is designed and configured to access and clean hard-to-reach areas of certain controlled and regulated environments (e.g., isolator equipment and other similar equipment) while preventing cross-contamination. The asymmetrical (or trapezoidal) frame design with the offset yoke/integrated hinge mount provides less passes/lanes while allowing additional reach for the ICT during the cleaning operation. The asymmetrical hinge mount integrated within the frame lowers the pivot profile for better stability and reduces both the number of manufactured/hardware parts and inside edges for soil entrapment. The ICT and its various components can be manufactured from a lightweight material (e.g., carbon fiber composite, plastics, aluminum and other equivalent materials).

The unique configuration of the packaging tray in the hands-free process minimizes cross-contamination, eliminating the need for fine motor actions that are difficult to perform (especially with gloves) during the cleaning operation. The innovative configuration of the tray compartment and the placement of the pad assemblies within each compartment provide a competitive advantage to operators during the cleaning operation. The pad assemblies can be further arranged for sequential use, thereby making the package easy to open and/or reopen during use. The packaging with the integrated wipe, pad and backer provides a means for easily separating soiled and sterile pads and further aids the user in confirming full saturation of the pads (when using dry pads). Such unique packaging can reduce issues related to tracking and inventory control while providing a cost-efficient means for receiving soiled pads in the isolator and eliminating them without further handling by the user.

Various embodiments of the system, apparatus and methods of cleaning controlled and regulated equipment disclosed herein can be used in industries such as aerospace/defense, automotive, food manufacturing, health care, medical devices, microelectronics, optics, pharmaceuticals, print, university labs and industrial manufacturing. During cleaning, the tool can be maneuvered within the isolator to clean all the surfaces and the hardware—starting from the ceiling, to the back wall, to the side walls and finish with the deck for a complete cleaning of the equipment without any damage or cross-contamination—while providing complete protection of the worker's hands and arms within the cleaning chamber. The cleaning tool is enabled to be ergonomically configured with a multi-pivoting rectangular or triangular head for cleaning compound isolators, biological safety cabinets, laminar flow hoods, RABS, glove boxes and other similar mini-environments.

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter. The references made above in detail to the embodiments of the disclosure are provided by way of explanation of the disclosure, not in limitation of the disclosure. It will be apparent to those skilled in the art that various modifications and variations can be made in the present disclosure without departing from the scope or spirit of the disclosure. Features illustrated or described as part of one embodiment can be used on another embodiment to yield a still further embodiment. Thus, it is intended that the present disclosure cover such modifications and variations as come within the scope of the appended claims and their equivalents. Other objects, features and aspects of the present disclosure are disclosed in the following detailed description. It is to be understood by one of ordinary skill in the art that the present discussion is a description of exemplary embodiments only, and is not intended as limiting the broader aspects of the present disclosure, which broader aspects are embodied in the exemplary constructions.

BRIEF DESCRIPTION OF THE DRAWINGS

The disclosure will be more readily understood in view of the following description when accompanied by the below figures. The accompanying figures incorporated in and forming a part of the specification illustrate several aspects of the present invention and, together with the description, serve to explain the principles of the invention.

DETAILED DESCRIPTION OF THE DISCLOSURE

Figure 1A:
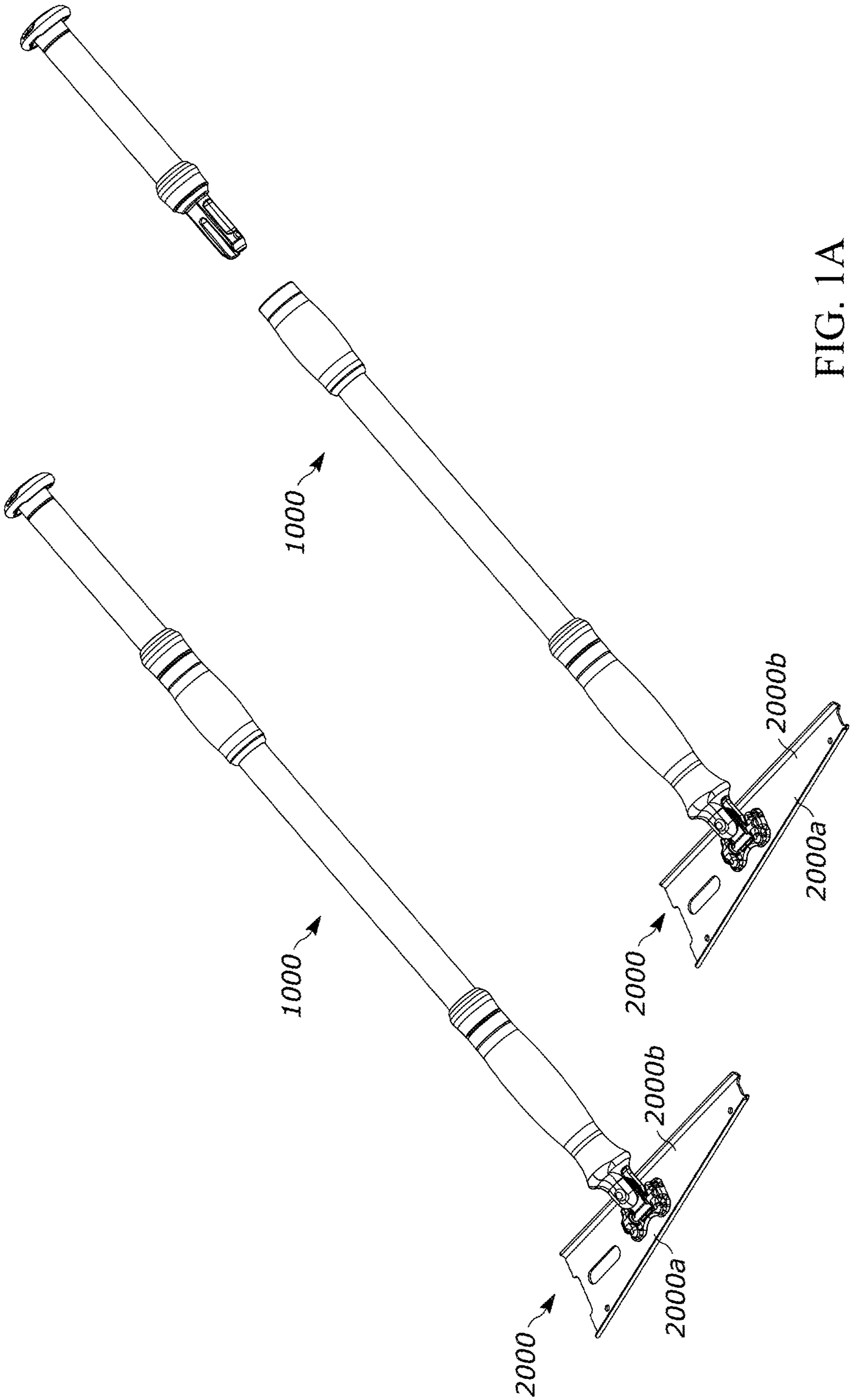
FIGS. 1A-B illustrate an embodiment of the isolator cleaning system, apparatus and method comprising the isolator cleaning tool according to one aspect of the present disclosure.

For the purposes of promoting and understanding the principles disclosed herein, reference is now made to the preferred embodiments illustrated in the drawings, and specific language is used to describe the same. It is understood that no limitation of the scope of the disclosure is hereby intended. Such alterations and further modifications in the illustrated system, apparatus and method, and such further applications of the principles disclosed and illustrated herein are contemplated as would normally occur to one of ordinary skill in the art to which this disclosure relates.

As shown in FIGS. 1 through 4, a system, apparatus and method for cleaning controlled and regulated equipment comprises a tool 1000 having (1) a tool handle including a first handle portion 200 removably connected to a second handle portion 400. As further illustrated, a tool head frame 2000 is pivotably connectable to the second handle portion 400. The tool head frame 2000 includes a leading edge 2000*a* opposite a trailing edge 2000*b* and a first side edge 2000*c* opposite a parallel second side edge 2000*d* disposed between the leading 2000*a* and the trailing edge 2000*b*—the leading edge 2000*a* and the trailing edge 2000*b* are non-parallel to each other and forming a trapezoidal-shaped tool head frame 2000. The first handle portion 200 further includes an ergonomic grip portion and the second handle portion 400 includes an engagement grip portion. The first handle portion 200 and the second handle portion 400 are removably connected to each other via a quick-release mechanism which can be configured as a molded-in spring clip (1200, 1400) or a plurality of polymagnets 1600, 1700 (negative magnet) and 1800 (positive magnet) as shown in FIGS. 3A-B. The polymagnets shown in FIG. 3B can register and attach as standard magnets. An ergonomic grip 1500 can cover over the two handle sections connected via a molded-in spring clip. In order to disengage the magnets, an operator needs to simply rotate one handle 180 degrees and pull the two handles apart (the rotation is programmed into the magnets). In the depicted embodiment, the tool head frame 2000 is further comprised of (1) a yoke attachment 2002 disposed offset from the center of the tool head frame 2000 and centrally located between the first side edge 2000*c* and the second edge 2000*d* of the frame 2000 in order to provide additional access during cleaning of the equipment; and/or (2) an integrated hinge mount 2004 disposed offset from the center of the tool head frame 2000 and centrally located between the first side edge 2000*c* and the second edge 2000*d* of the frame 2000 in order to provide additional access and stability during cleaning of the equipment.

Figure 4A:
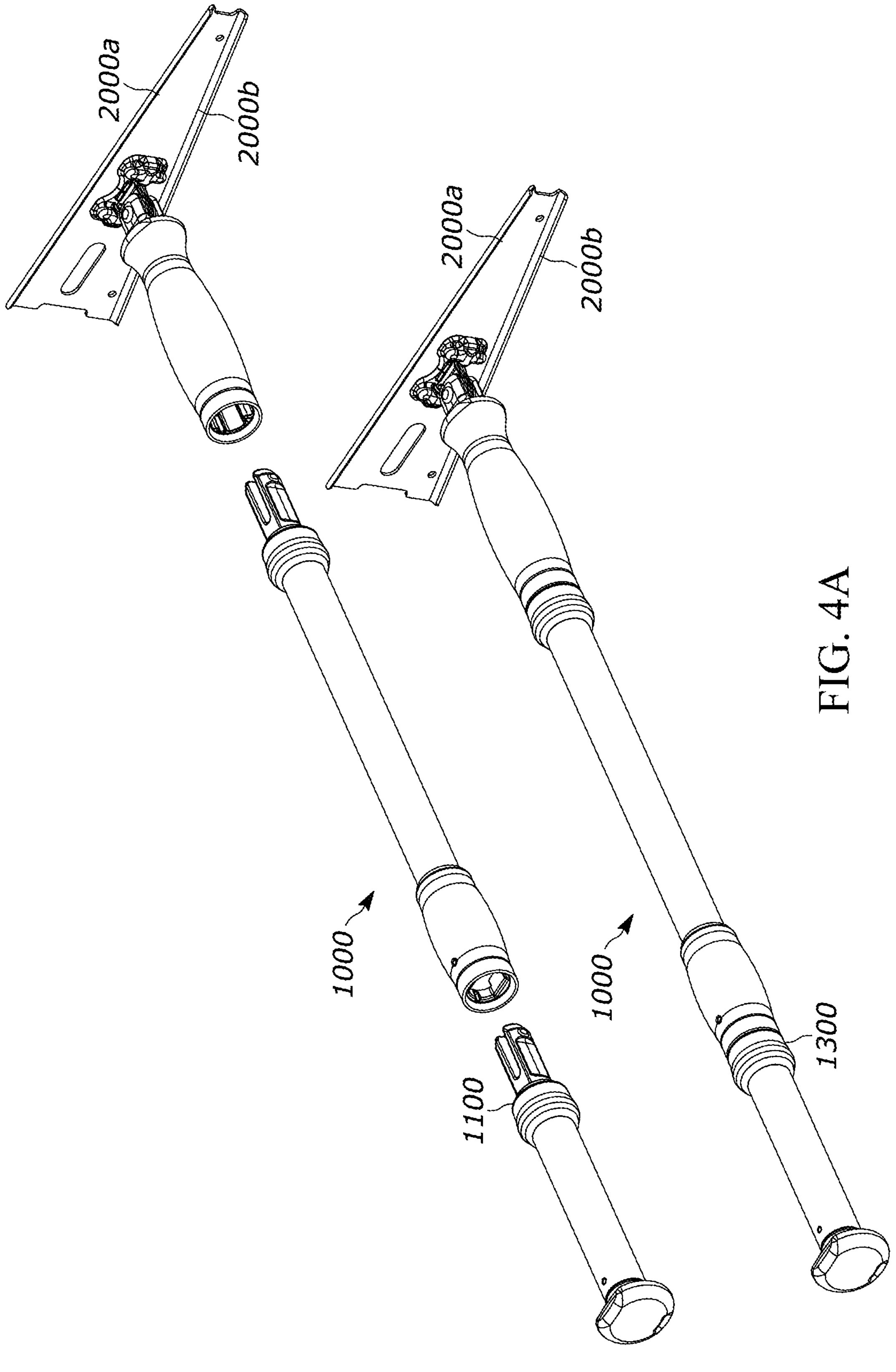
FIGS. 4A-B illustrate an embodiment of the isolator cleaning system, apparatus and method comprising the isolator cleaning tool along with the tool head frame for attachment/detachment to a pad assembly with a backer according to one aspect of the present disclosure.
Figure 4B:
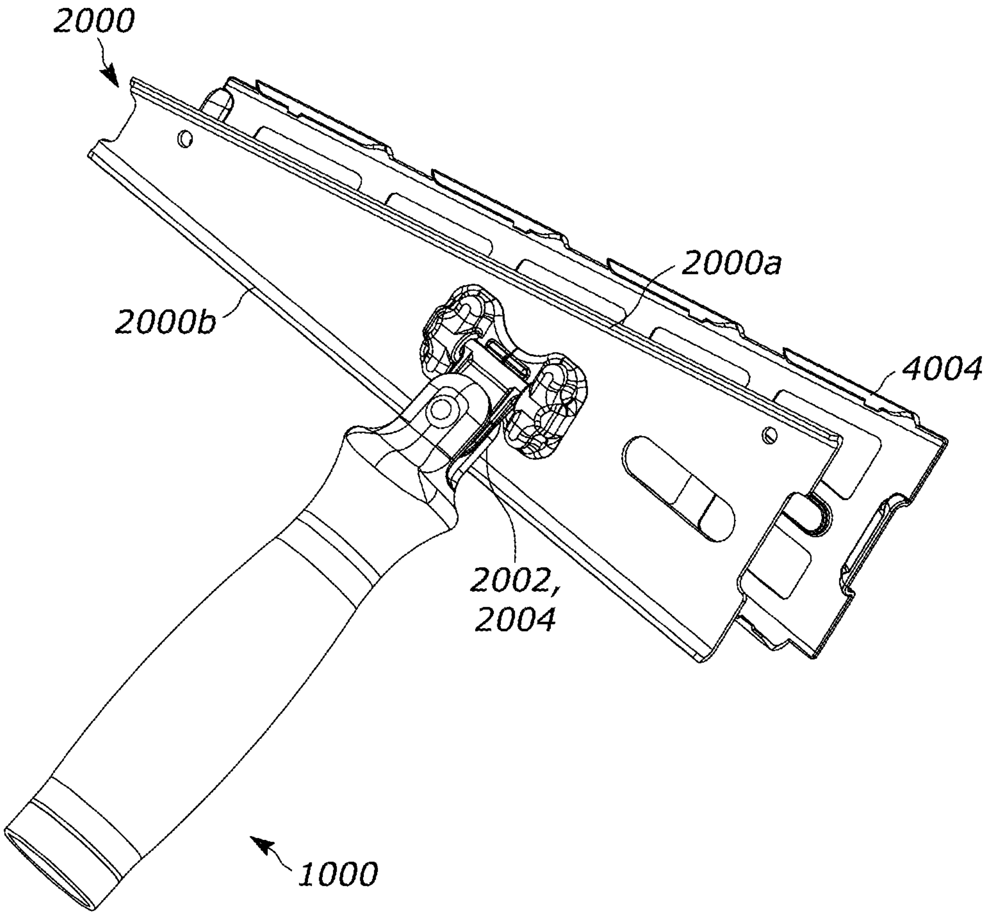
Figure 9A:
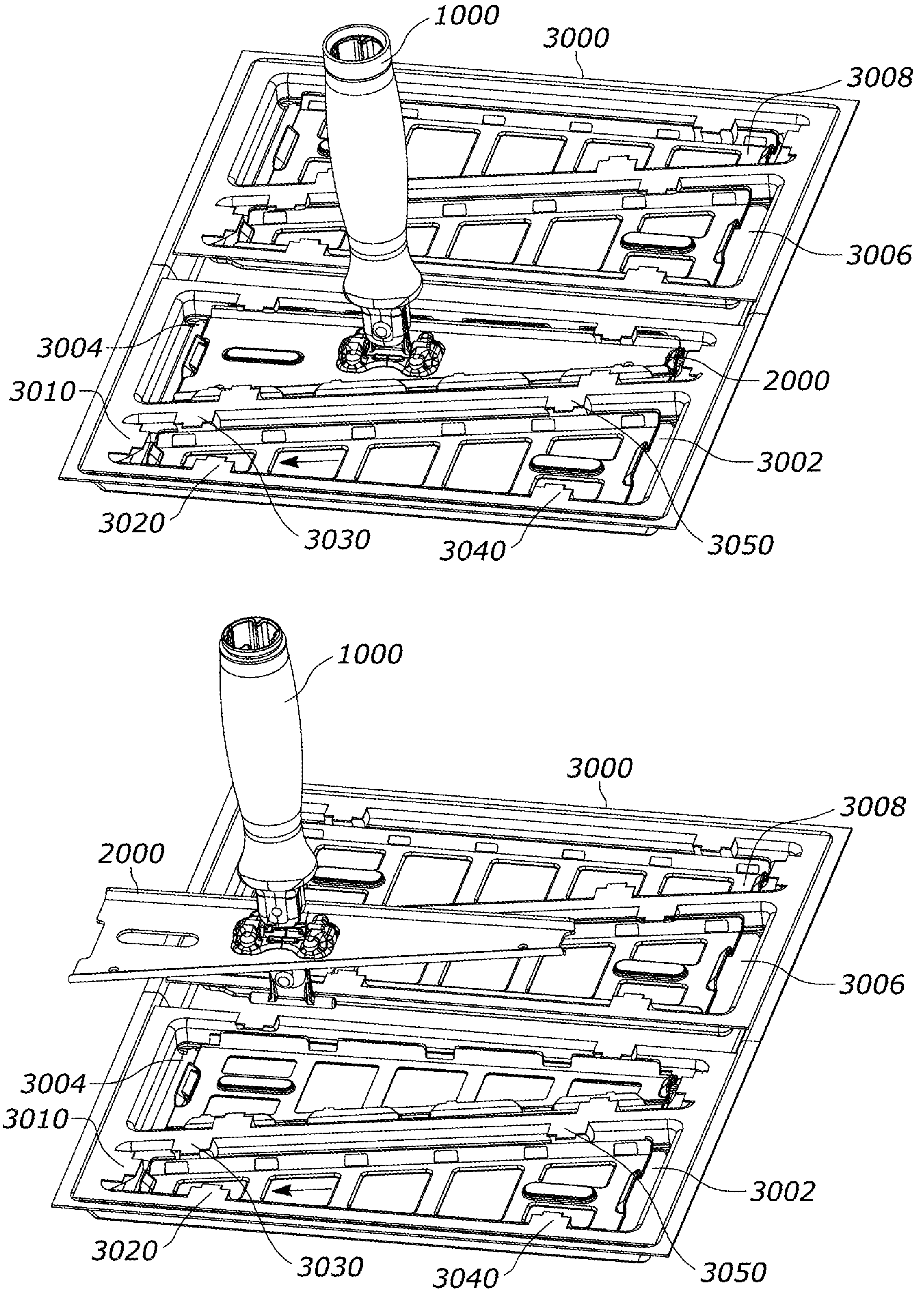
FIGS. 9A-B illustrate an embodiment of the isolator cleaning system, apparatus and method showing the hands-free engagement/disengagement engaging/disengaging the tool with a pad assembly with packaging according to one aspect of the present disclosure.
Figure 9B:
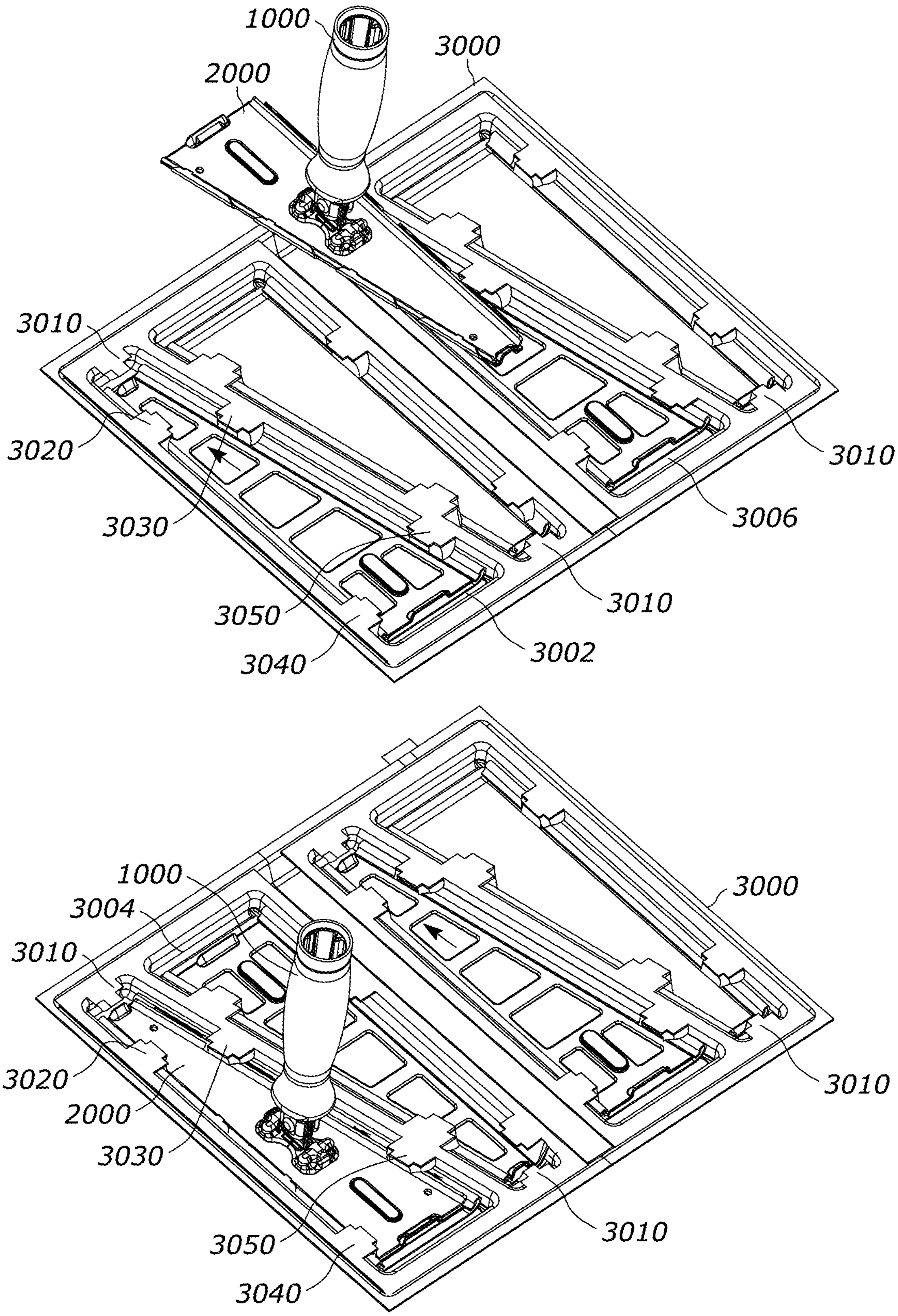
Figure 10:
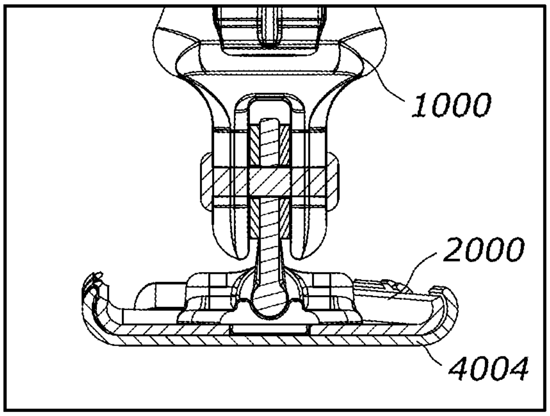
FIG. 10 illustrates an embodiment of the isolator cleaning system, apparatus and method with a cross-section view of the backer connected to the tool head showing the concentric alignment of the curved edges according to one aspect of the present disclosure.

The tool head frame 2000, shown in FIGS. 1A-B and 4A-B, is designed and optimized for maximum coverage of the cleaning area while providing a dedicated portion of the tool 1000 that can access and clean difficult-to-reach small areas during the cleaning process. FIG. 4A shows the tool 1000 comprising silicone seals (1300) to prevent contamination incursion during cleaning. In addition, the quick-connect segments of the tool handle can comprise of a snap-in connector (1100) as shown in FIG. 4A. FIG. 4B illustrates the tool head frame 2000 having the multi-pivot yoke mechanism (2002, 2004) configured to attach to an integrated pad assembly/backer. The tool head frame 2000 is enabled with hands-free engagement means to engage and attach to a integrated pad assembly/backer—an unitary pad assembly 4000 contained in a packaging tray 3000 (as shown in FIGS. 9A-B). The grasping portion of the tool 1000 comprises an ergonomic grip mechanism for comfort and safe ergonomic handling—the tool providing easy maneuverability and efficient cleaning of certain controlled environments (e.g., requiring no motor motions that are generally difficult for a user with gloved hands during cleaning). Tool handles of various lengths (e.g., from long handle to a handle grip only ranging in length from 16.7 cm to 64.5 cm or other ranges of length) can be used in various combinations with the system, apparatus and method disclosed herein. As discussed above, FIG. 2 illustrates alternative embodiments of the isolator cleaning system, apparatus and method having tool heads of various sizes and shapes according to one aspect of the present disclosure. In other embodiments, the tool can be configured with various shapes and sizes of tool heads—standard rectangular 6000 having a certain pre-determined length and width, standard triangular 7000 and trapezoidal 8000 in FIG. 2. For instance, a standard rectangular tool head 600 measuring approximately seven inches in length along the longer edge of the rectangular head, or a triangular tool head 7000 with much shorter length edges, can be used with the apparatus, system and methods disclosed herein As further illustrated in FIGS. 1A-B, the tool head frame 2000 includes the yoke attachment 2002 disposed offset from the center of the tool head frame 2000 and centrally located between the first side edge 2000*c* and the second edge 2000*d* of the frame 2000 in order to provide additional access during cleaning of the equipment. The tool 1000 (or the tool handle having the first handle removably connected to the second handle portion) comprises a quick-release mechanism configured to removably connect long handle extensions with an ergonomic grip of a short handle—the longitudinal axis of the short handle linearly aligned with the axis of the long handle to form the tool 1000. The short handle can be further configured with a built-in pivot snap mechanism designed to snap into a tool head 2000 of the isolator cleaning tool (as shown in FIGS. 1A-B, 3 and 4A-B).

Figure 1B:
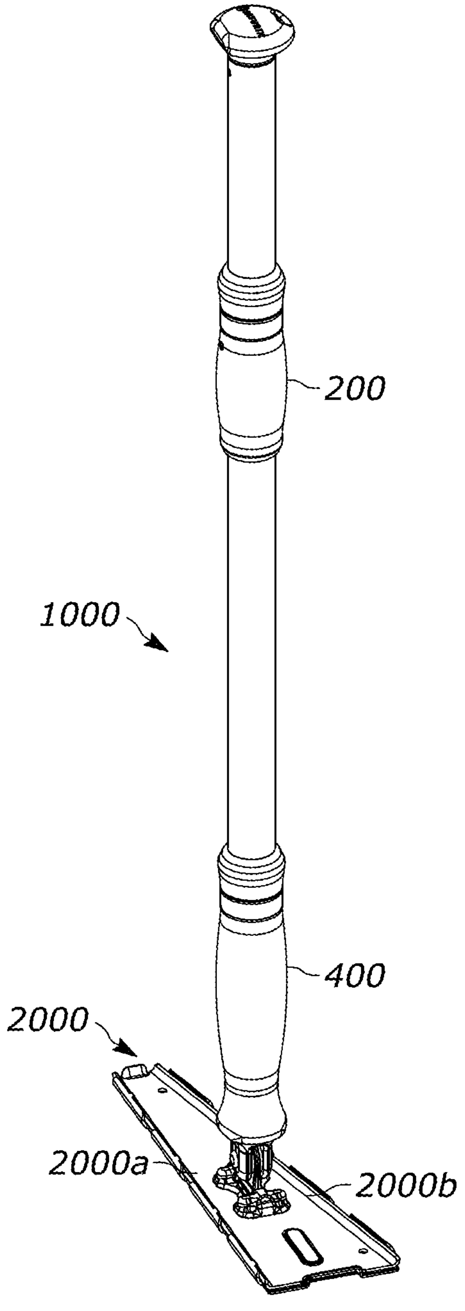
Figure 12:
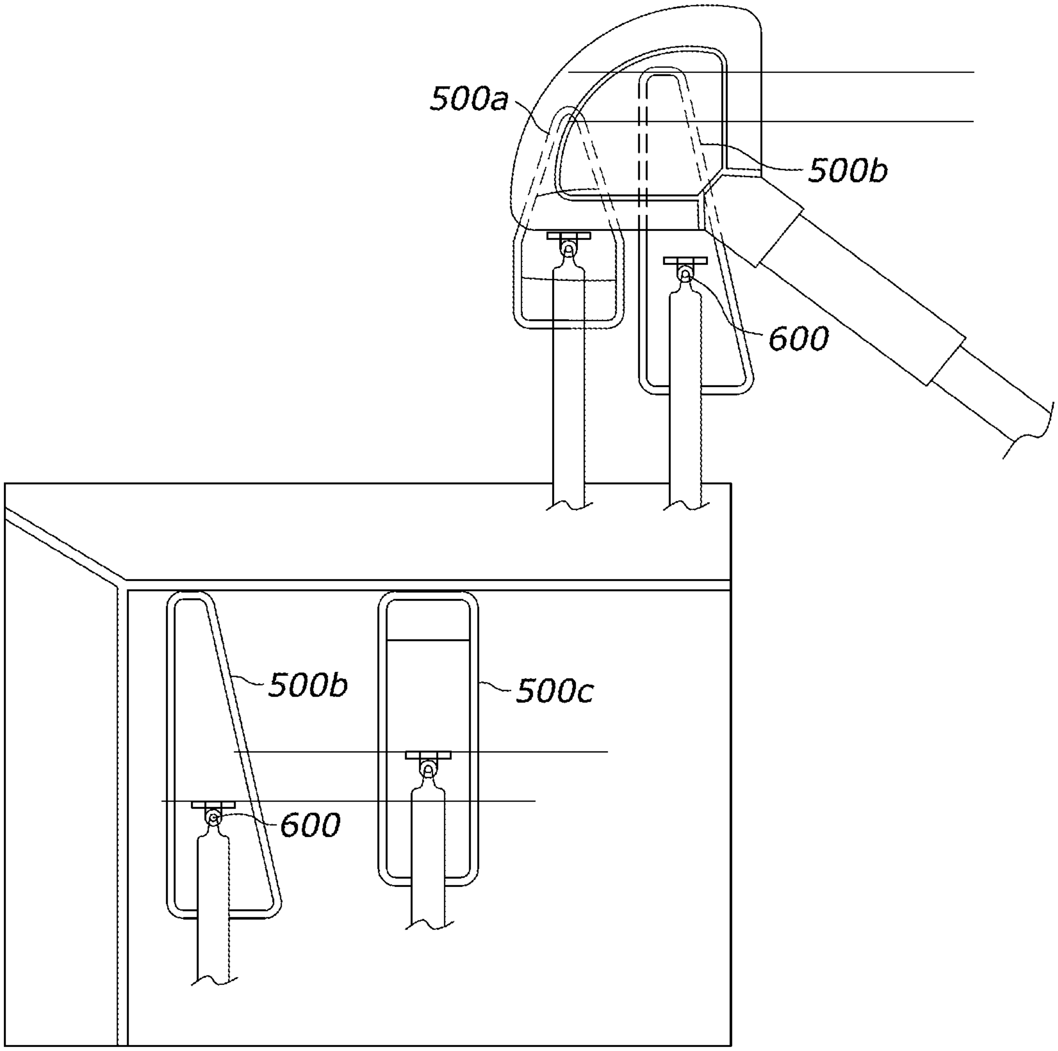
FIG. 12 illustrates an embodiment of the isolator cleaning system, apparatus and method showing the advantage of the minimalistic form factor design of the isolator cleaning tool configured for greater/shorter reach as needed during the cleaning operation according to one aspect of the present disclosure.

In another aspect of the present disclosure, the tool 1000 can include a short handle further configured with a built-in, multi-pivot yoke snap mechanism designed to snap into the tool head frame 2000 having the narrow end opposite the wider end along with long edges connecting both ends of the trapezoidal frame (as shown in FIGS. 1A-B). The isolator cleaning tool has a minimalistic form factor which can include a tool handle ranging in length between, for example, approximately 12 inches and 18 inches. For instance, FIG. 12 illustrates an embodiment of the isolator cleaning system, apparatus and method showing the advantage of the minimalistic form factor design of the isolator cleaning tool configured for greater/shorter reach as needed during the cleaning operation according to one aspect of the present disclosure. The frame hinge attached to the yoke of the tool 1000 from the underside provides a unique lower profile of the tool, different from currently available isolator cleaning tools (prior art) and a conventional flat mop typical of mopping floors regardless of the size of the tool. The location of the double joint swivel positioned closer to the wider end of the rectangular head frame 2000 provides ergonomic and efficient cleaning of the hard-to-reach areas of certain regulated and controlled environments (e.g., isolator equipment).

As further illustrated in the above figures, the handle extension for the tool 1000 can be shaped as a knob for better rotation control and relaxed ergonomic gripping of the tool during cleaning operation. One of the key aspects of the apparatus, system and method comprising the isolator cleaning tool 1000 is the quick-release handle mechanism configured and enabled with various means for the quick-release functionality. For instance, the handle can comprise an built-in/molded-in type of spring clip and/or magnet (e.g., poly magnets whose functionality can be programmed). Various embodiments of the quick-release mechanism are shown in FIG. 3. The handle 1000 is further designed (sized and shaped) and configured for providing ergonomic functionality and an advantageous ergonomic anatomical posture for the user during cleaning. For instance, the pivot-snap mechanism of the handle 1000 is configured for easy snapping of the tool handle into the head of the tool. Once snapped, the isolator cleaning tool 1000 pivotably connected to the tool head frame 2000 is further enabled to be press fitted—hands-free—into a cleaning pad assembly 4000 (not shown in all the figures for clarity).

In yet another aspect of the present disclosure, the system, apparatus and method of cleaning regulated and controlled equipment comprises quick disconnect handle segments configured to position and retain each of the handle segments adjacent to each other. For instance, a connector of the quick disconnect handle segment may comprise a radial positioning receptacle configured to receive a male that is split into multiple sections that flexes during insertion and provides retaining force perpendicular to the handle centerline of the cleaning tool. The receptacle is shaped as a cylinder having at least one flat section longitudinally that prevents the assembly from rotating when engaged. The cleaning tool 1000 is configured with cylindrical split male sections having at least one flat corresponding to flats within the receptacle to prevent the assembly from rotating once assembled. The receptacle has at least one female or male detent corresponding to at least one female or male feature on the split male sections, such that, when the assembly is fully seated, the male and female interlock with each other to hold the tool handle sections together. During the cleaning operation the tool sections are first engaged and the split male sections are then bent and deflected allowing for the tool engagement. Once the engagement is fully seated, the male and female detents engage and the split male sections return to positions parallel to the tool axis, thereby allowing for quick change of tool lengths without any fine motor manipulation.

Figure 5A:
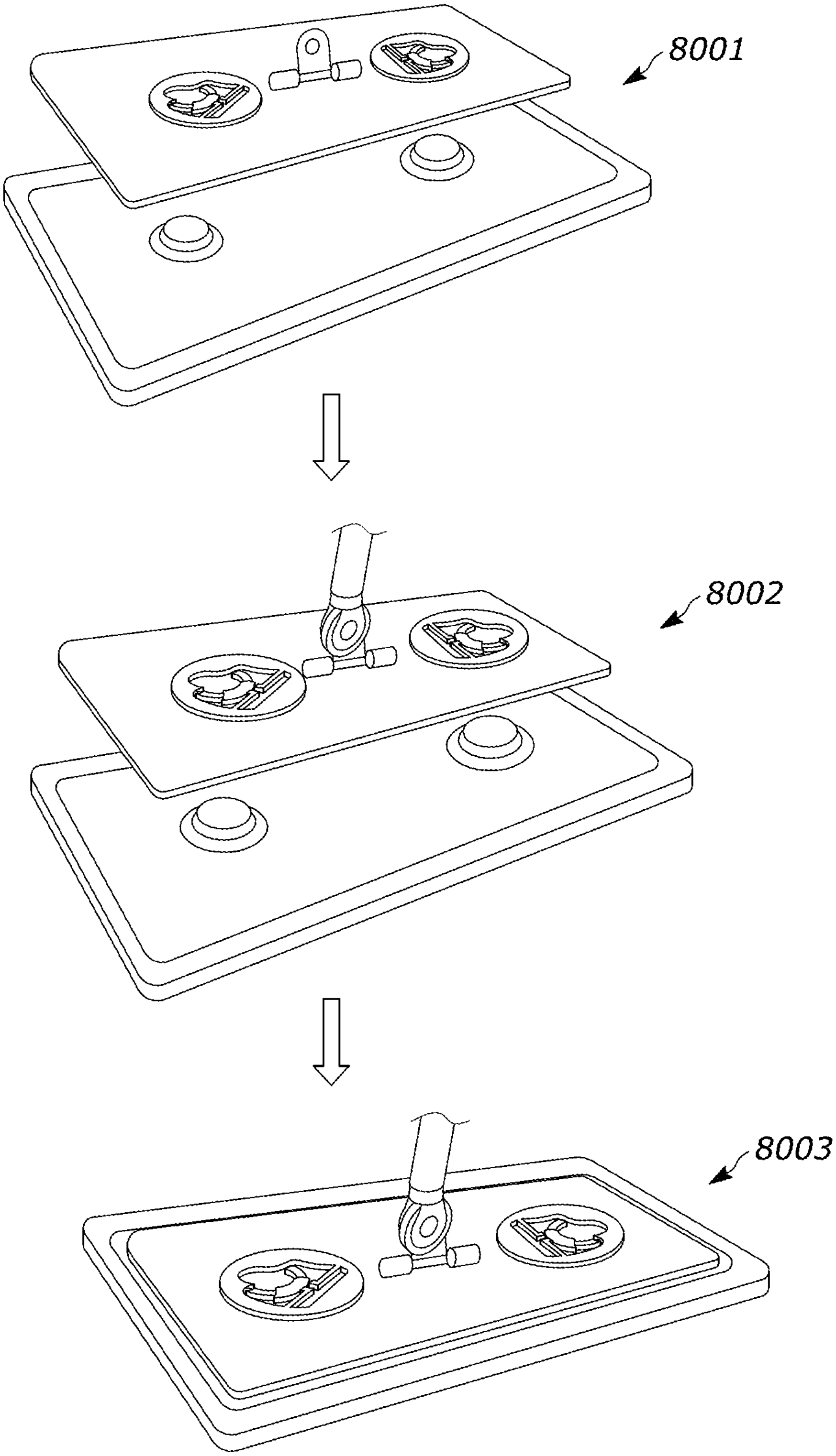
FIGS. 5A-B illustrates alternative embodiments of the isolator cleaning system, apparatus and method showing the attachment/detachment mechanism of the tool head frame to a pad assembly according to one aspect of the present disclosure.
Figure 5B:
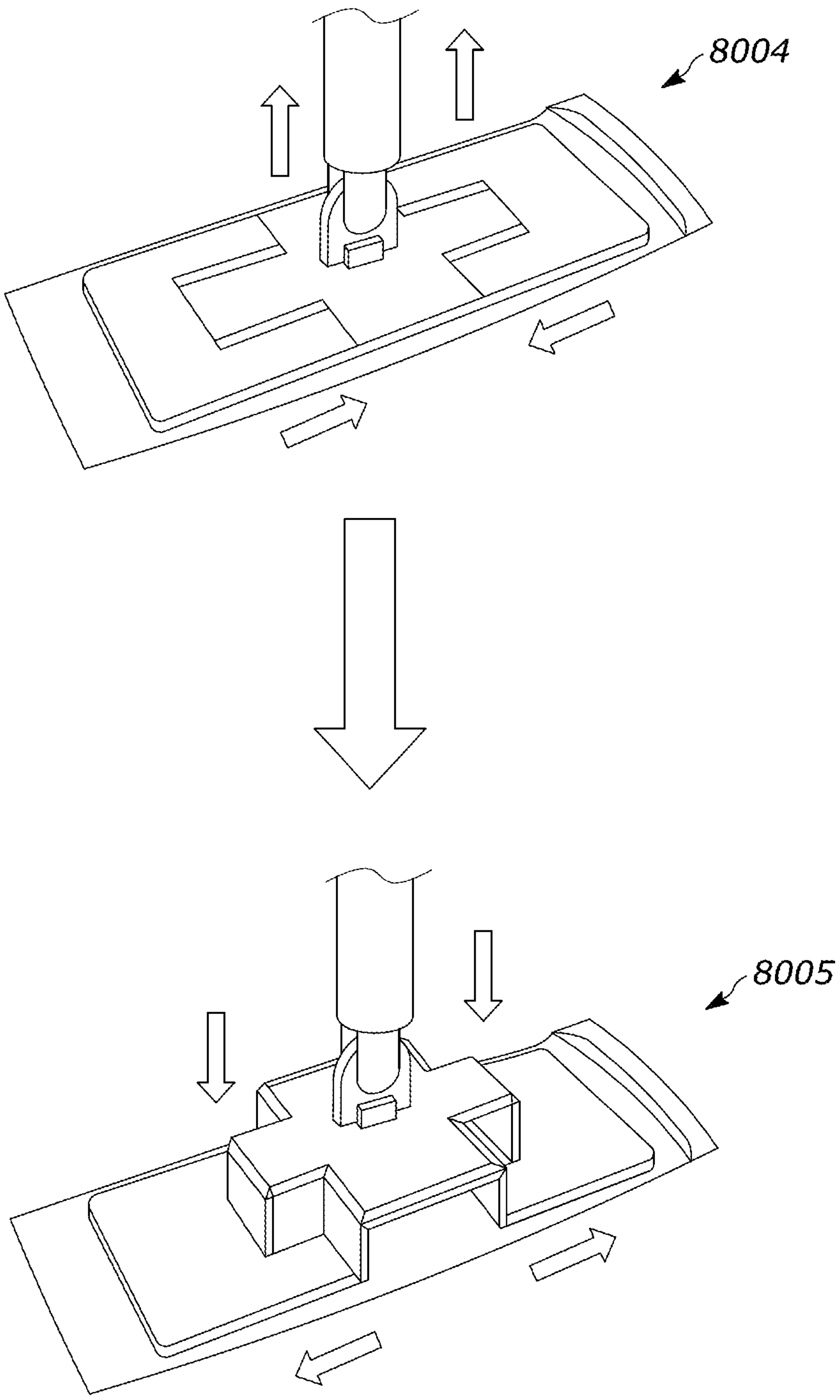
Figure 6:
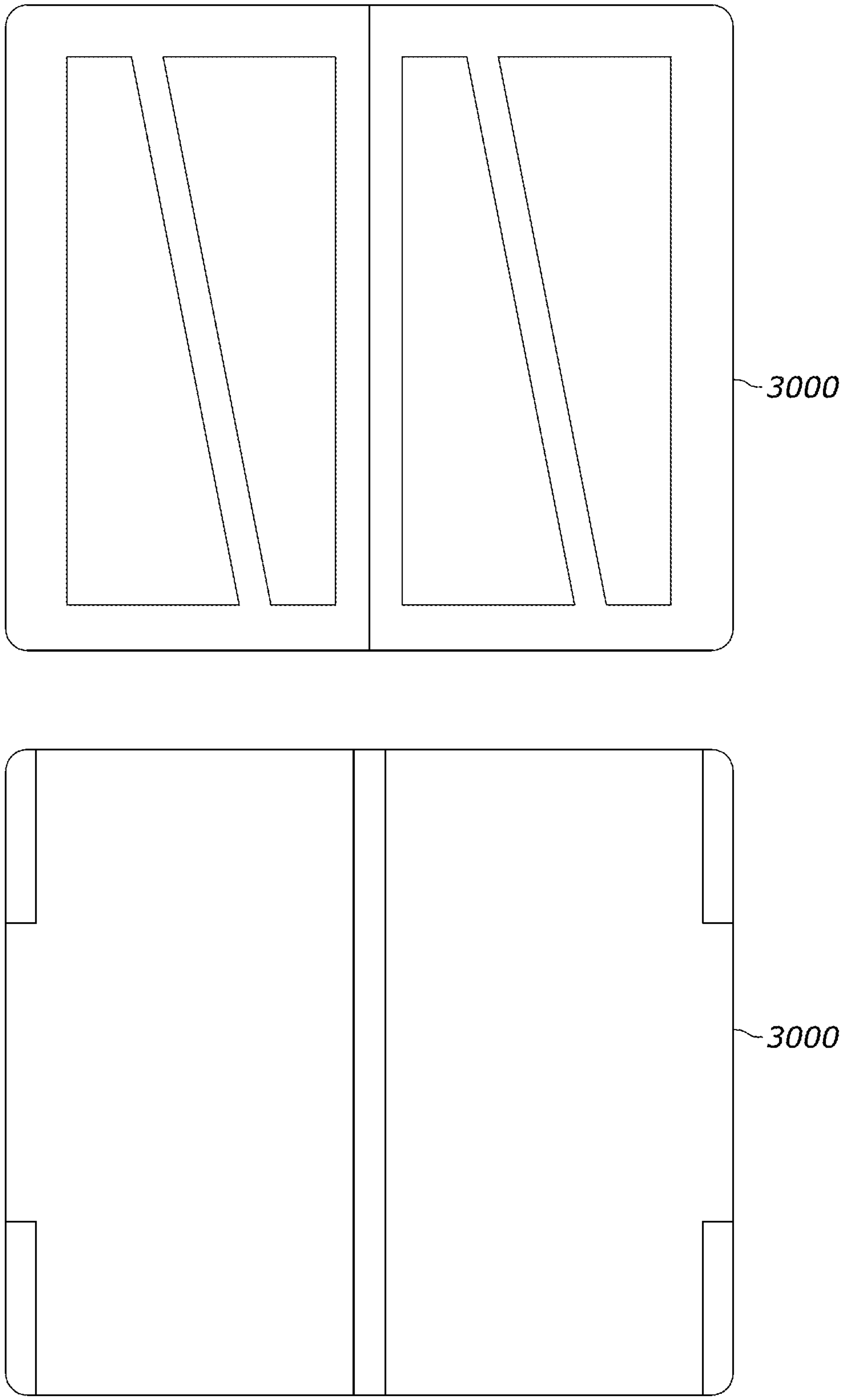
FIG. 6 illustrates an embodiment of the isolator cleaning system, apparatus and method comprising a packaging tray having a plurality of compartments according to one aspect of the present disclosure.
Figure 11:
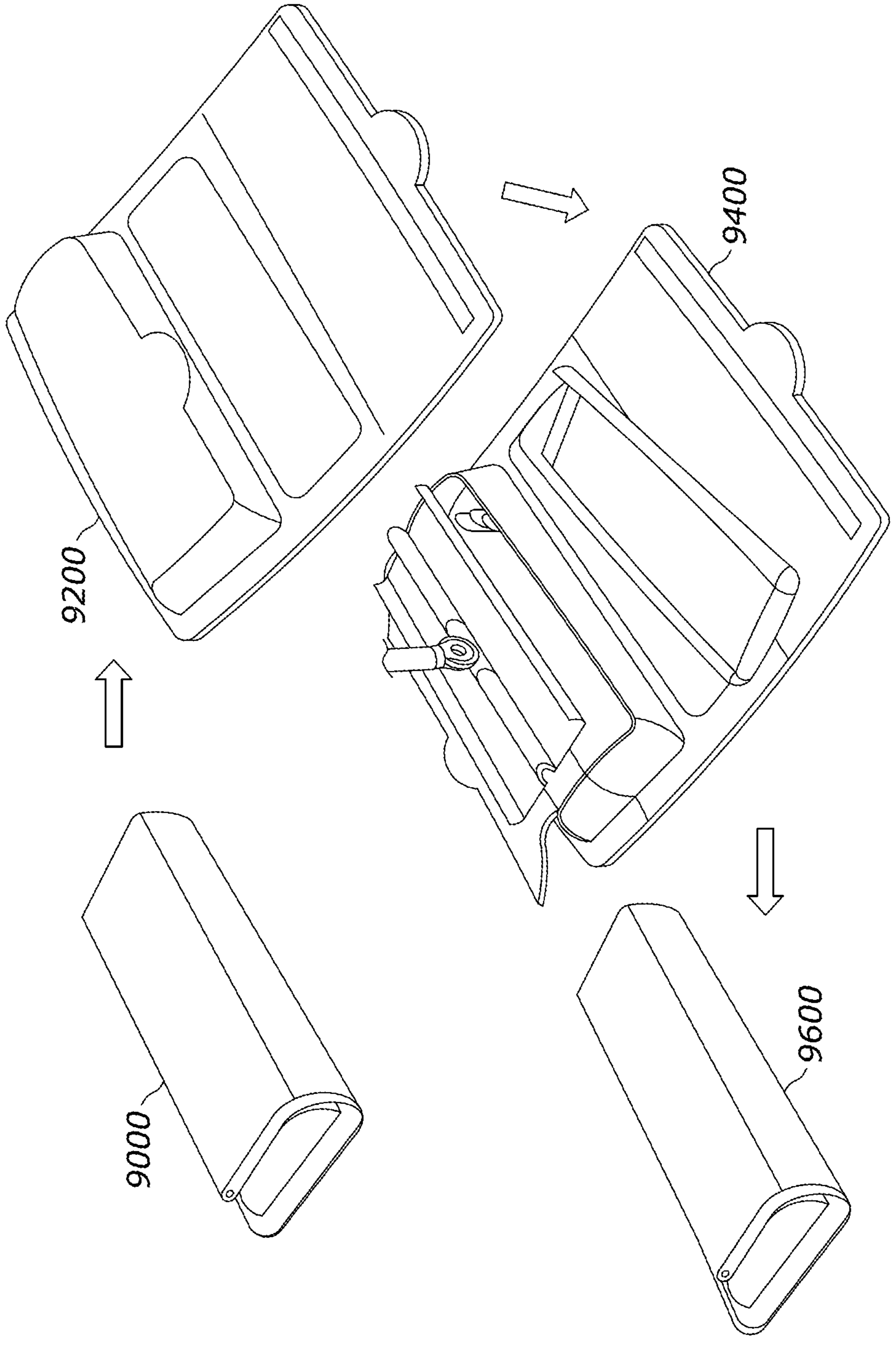
FIG. 11 illustrates alternative embodiments of the isolator cleaning system, apparatus and method comprising an interchangeable pad system according to one aspect of the present disclosure

In various other embodiments, the hands-free mechanism of the isolator cleaning tool 1000 can be configured and enabled with molded-in buttons/snaps—for instance, the frame can be pressed hands-free into the textile pad with an integrated plastic top along with molded-in snaps. In some embodiments the mechanism can comprise (1) built-in/molded-in buttons/snaps and/or (2) an asymmetrical double fold for the mechanism. FIGS. 5A-B illustrates alternative embodiments of the isolator cleaning system, apparatus and method showing the hands-free attachment/detachment mechanism of the tool head frame to a pad assembly according to one aspect of the present disclosure. The plastic spring is fixed to a stainless steel frame with the spring having molded-in snaps to open the spring and release the frame using a thumb and a finger. An operator using a thumb and finger can release and open up the plastic spring (8001, 8002, 8003)—hands-free without touching the pad—and attach the frame to the pad. In other alternative embodiments, for the hands-free mechanism configured and enabled with the symmetrical and asymmetric fold, a user can manually press down the handle with one hand to open the frame/head flat and engage with the two end pockets of the pad (8004, 8005 as shown in FIGS. 5A-B). The built-in integrated detents lock in the flat position while the user can press the frame with one hand and the lifting handle with the other hand, thereby symmetrically (as illustrated) folding the frame without touching the pad, as illustrated. The pad configured with the means for quick and efficient pad removal can be ultrasonically bonded to the foam that is attached on the edge of the frame head. In other embodiments, and as shown in FIG. 11, the configuration of the tool 1000 further enables easy and efficient interchanging of the used cleaning pads with new cleaning pads via a novel and innovative pad interchange system. The operator then brings the tool head in proximity to the pad compartment, removes the old pad and engages the tool head (e.g., by pressing or by other means) to capture a clean pad from the top of the package. The operator can then easily wrap the used pads in the package and close and dispose of the package of old pads. As shown in FIG. 11, during cleaning, an operator first removes a pad from the package (9000) after laying the package flat (9200) and opening the sealed pad compartment of the pad interchange system, pressing the tool-head into the top pad to engage the pad "hands-free" and then snap-off used pads onto the open flap using the tool (9400) and wrap used pads in the package—the package closed with resealable adhesive and disposed (9600).

Figure 2:
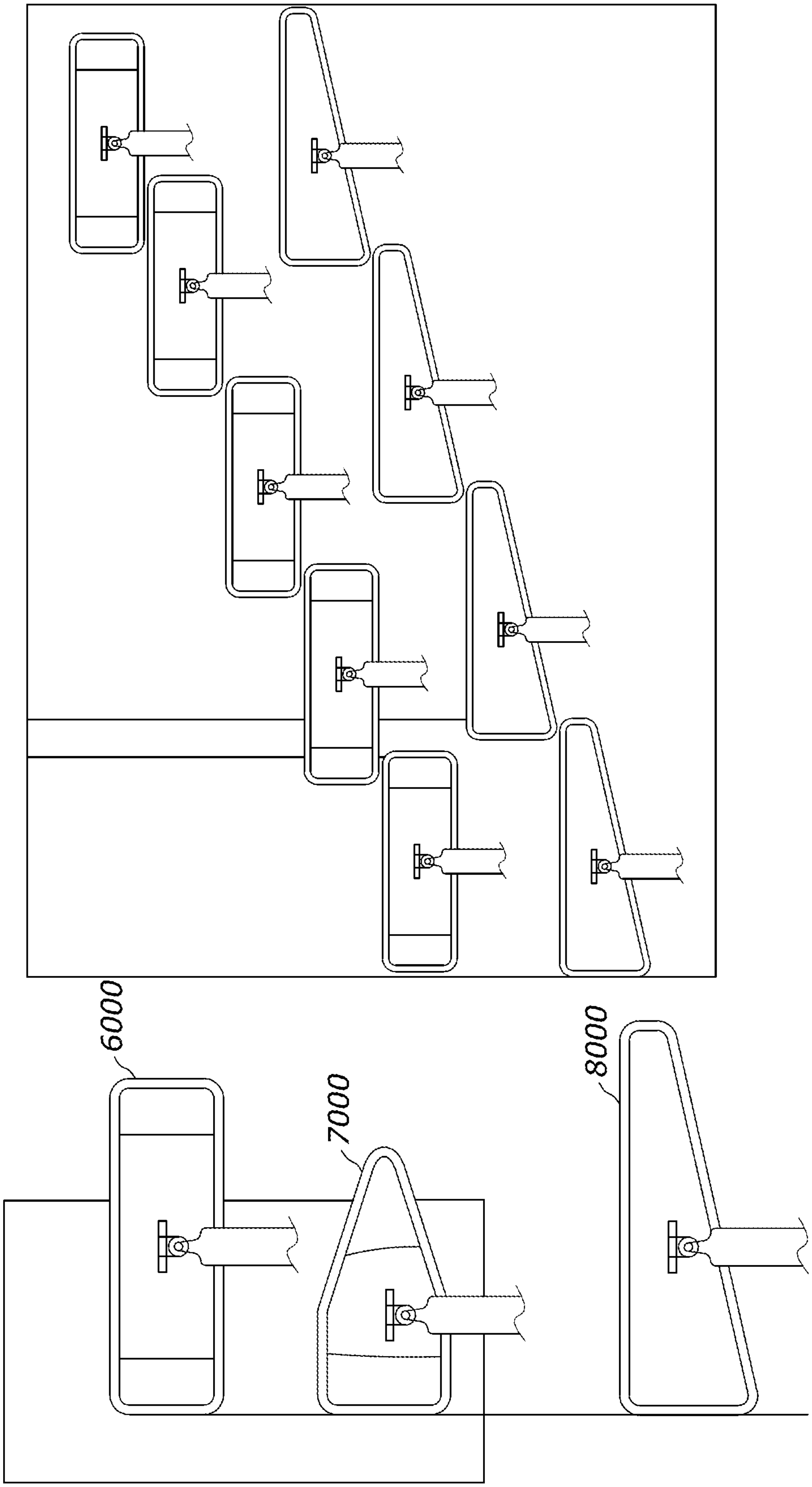
FIG. 2 illustrates alternative embodiments of the isolator cleaning system, apparatus and method having tool heads of various sizes and shapes according to one aspect of the present disclosure.
Figure 3A:
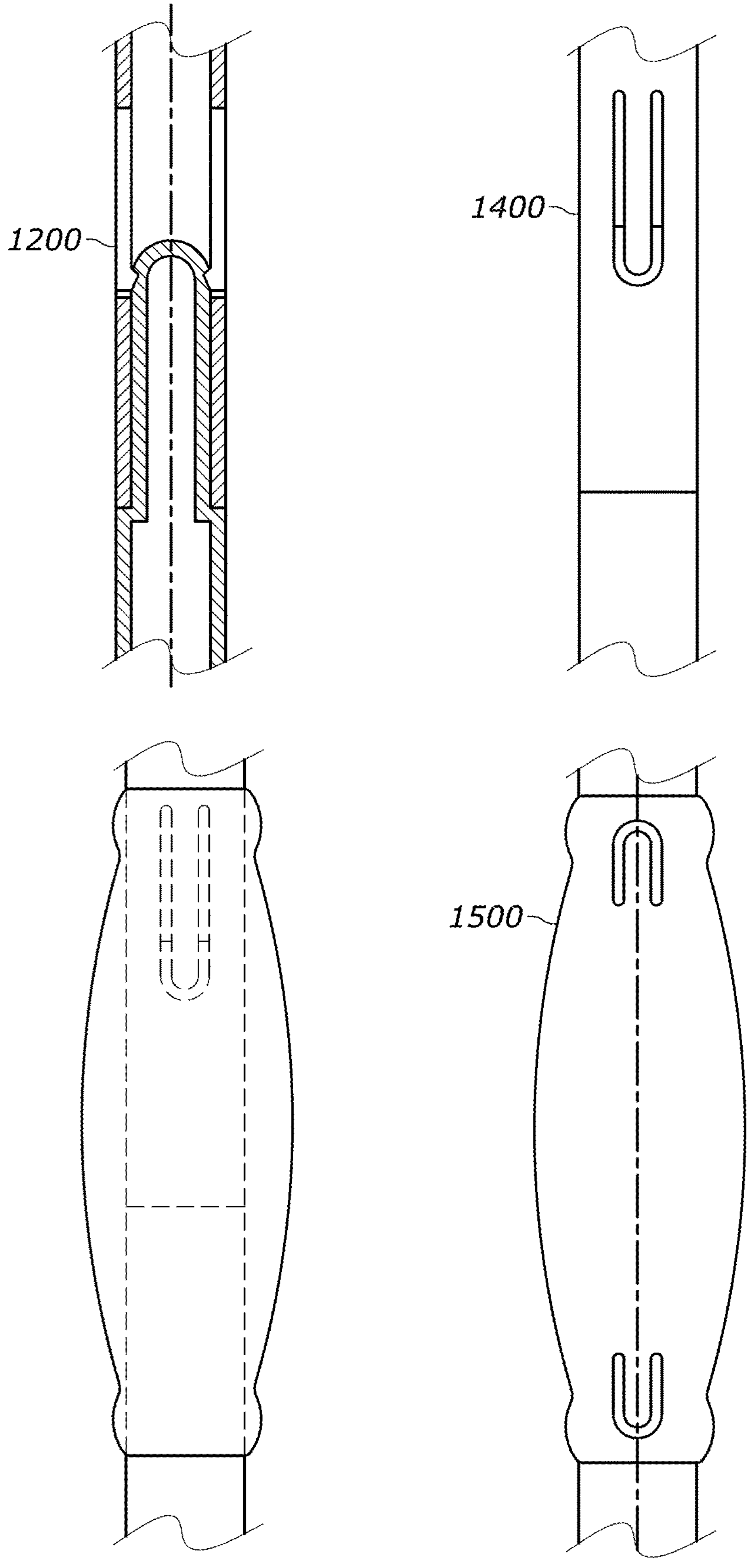
FIGS. 3A-B illustrate an embodiment of the isolator cleaning system, apparatus and method comprising the quick-release mechanism of the isolator cleaning tool according to one aspect of the present disclosure.
Figure 3B:
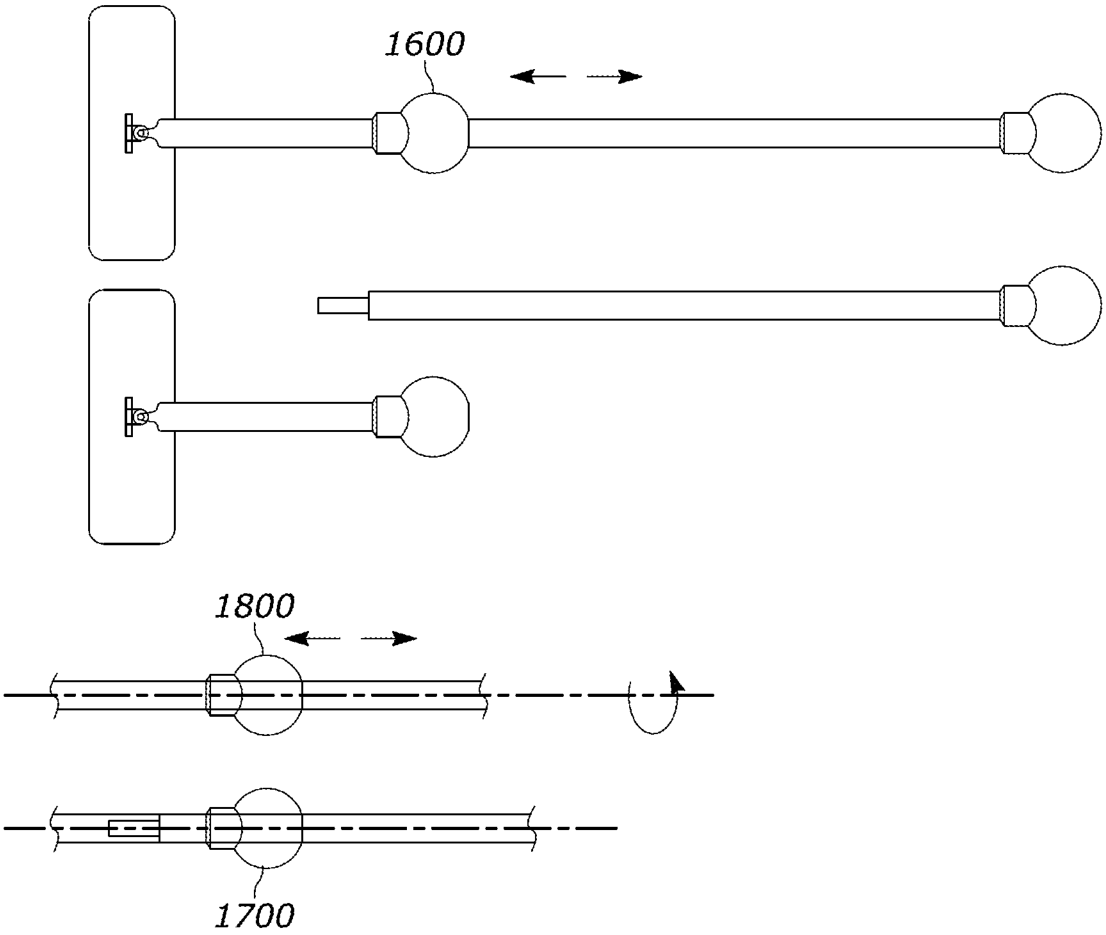

In other aspects of the present disclosure, the tool head 2000 can be sized to certain predetermined form factor for easy accessibility of hard-to-reach detail areas of cleaning equipment. Various materials such as stainless steel or plastic—formed and shaped to provide a minimalistic form factor (as shown in FIG. 12)—can be used to manufacture the isolator cleaning tool. As shown in FIG. 12, the offset attachment 600 of the tool handle to the tool head provides for greater and/or shorter reach under fixtures/hardware (500*a*, 500*b*, 500*c*, 500*d*). In various other embodiments, the tool head can have a certain angled shape designed for flexibility, maneuverability and adaptability for accessing and cleaning the hard-to-reach detail areas of certain controlled and regulated environments, as shown in FIGS. 2 and 12. The frame surrounding such angled tool head can be further designed with rounded corners having a certain predetermined minimum radius in order to comply with industry-standard ergonomic guidelines. As further illustrated in FIG. 12, various advantages inherent in such minimalistic form factor and design include greater reach under certain fixtures/hardware within the targeted cleaning environment due to its asymmetrical design. As disclosed herein, the tool, having a certain predetermined form and length, is configured with a rotating rectangular or triangular head to access and clean certain difficult-to-access sections of isolator equipment. Further, tool handles of various lengths can be quickly and efficiently replaced without risking contamination of certain processes within equipment (e.g., autoclave sterilization process).

FIGS. 6 through 10 show the system, apparatus and methods for cleaning controlled and regulated equipment comprising a tray 3000 (also known as the packaging tray 3000) having a plurality of compartments (3002, 3004, 3006, 3008), configured to retain a pad assembly 4000 and a cleaning solution/cleaning fluid agent—the pad assembly 4000 and the cleaning solution/cleaning fluid agent are disposed in the compartments (3002, 3004, 3006, 3008) of the tray 3000. Each compartment comprises a first edge opposite a second edge and a first side opposite a parallel second side disposed between the first and the second edge respectively. The first edge and the second edge are non-parallel to each other and configured to complimentarily dispose a tool head frame 2000 therein. As illustrated, the tray 3000 comprises the plurality of compartments (3002, 3004, 3006, 3008) wherein each compartment is isolated from the other in order to allow the pad assembly 4000 to be positioned for easy attachment and detachment to the tool head frame 2000. The rectangular packaging tray comprises a top (or cover portion) and bottom portion having outer edges defined substantially about a periphery of the top and bottom portions (also shown in FIG. 6). The removable top and the bottom portions are connected such that during operation the top portion can be removed for easy changing and removing of pads. The cover portion of the packaging tray further provides a means of sealing the pads and keeping them clean and free of contaminants prior to use.

A portion of the floor plane within each compartment (3002, 3004, 3006, 3008) is raised, as shown in FIGS. 6 through 9A-B, in order to keep the unused pad assembly 4000 positioned towards the wider end of the compartment (3002, 3004, 3006, 3008) and present the pad assembly in a position for easy removal and use by a user during the cleaning operation. The plurality of contoured compartments (3002, 3004, 3006, 3008) are configured to generally align with the configuration of an asymmetrical/trapezoidal tool head frame 2000. As shown, each compartment has a first end and a second end wherein the first end and the second end are connected via opposite long edges having a narrowing shape, providing a tapered profile for the compartment similar to the asymmetrical trapezoidal tool head frame 2000.

The system, apparatus and method of cleaning controlled and regulated equipment is configured with the tray 3000 for quick detachment of the soiled or used pad and attachment of a new clean pad in a completely hands-free manner and without excessive effort on the part of the user. The tray 3000 to be used with the system, apparatus and method disclosed herein comprises a rectangular-shaped packaging tray 3000 having a plurality of contoured built-in compartments (3002, 3004, 3006, 3008) or wells formed therein. Each compartment or well is designated for a specific task (e.g., for storage, saturation, attachment of the new pads and storage and detachment of the used pads), along with preloaded cleaning pad assemblies (4000) consisting of a rigid backer and textile substrate. As shown, the backer has a projection that fits into a registration aperture of the tool head (see FIGS. 9A-B). During cleaning with an asymmetrical trapezoidal tool head 2000, the innovative packaging tray can be used for quick detachment of a used/soiled pad as well as attaching a new pad in a completely hands-free manner and without excessive effort on the part of the user. Further, as shown, each compartment (3002, 3004, 3006, 3008) of the packaging tray 4000 includes at least one projection (3002*a*, 3004*a*, 3006*a*, 3008*a*) extending from a wall of the compartment 3000—the projection configured to overlap an edge of the pad assembly 4000 when moved to the second position in order to retain the pad assembly 4000 within the compartment when the pad assembly 4000 is detached from the tool head frame 2000 during the cleaning operation.

Figure 7:
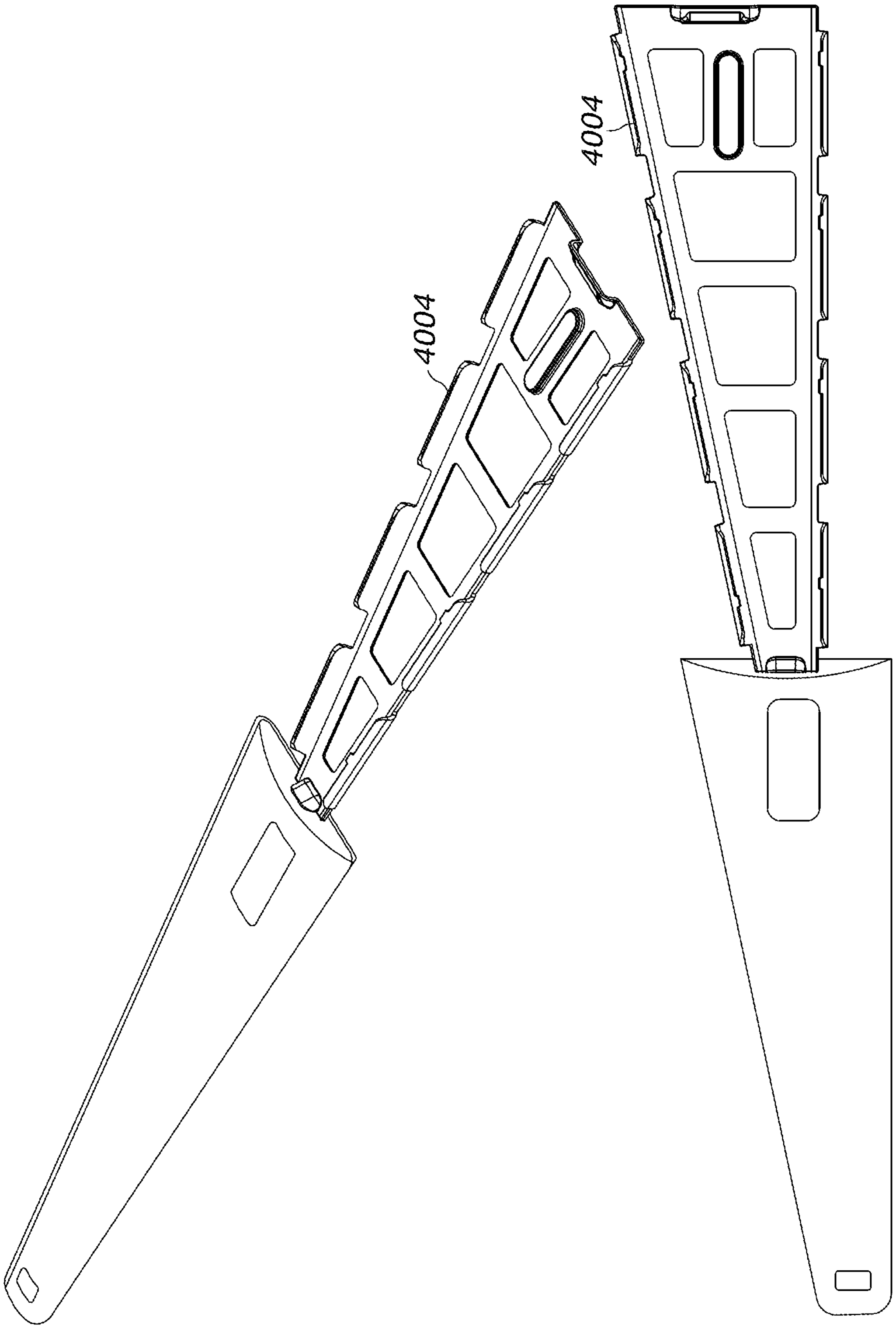
FIG. 7 illustrates an embodiment of the isolator cleaning system, apparatus and method comprising a pad assembly having the pad and the backer according to one aspect of the present disclosure.

As further illustrated in FIG. 7, the pad assembly 4000 comprises (1) a pad 4002; (2) a backer 4004 having opposite curved longitudinal edges and disposed in the pad 4002. Each of the leading edge 2000*a* and the trailing edge 2000*b* of the tool head frame 2000 has a partial cylindrical configuration (as shown in the FIGS. 1 and 2) with a predetermined radius of curvature configured to concentrically align and snap into the opposite curved longitudinal edges of the backer 4004 of the pad assembly 4000 (shown in FIG. 10). In addition, the raised protrusions (male protrusions at each end of the backer are configured to align and engage with the notches (female notches) at each end of the asymmetrical trapezoidal tool head 2000.

The disclosed system, apparatus and method provide a means for accurate saturation of multiple pad assemblies by filling a common reservoir. A precise amount of fluid agent is provided within each package to fully saturate all pads within the package without any remaining (or leftover) excess liquid that may flow to adjacent pads. The novel and unique configuration of the packaging is designed to expose one or more pads with the precise fluid amount emptied from the accompanying fluid package by pouring the entire amount of fluid provided into one or more fluid receptacles. Once poured, gravity will direct the fluid flow around all the pads within the package to be absorbed in equal amounts as each pad absorbs the fluid until it reaches its saturation level. The precise fluid amount allows each pad to be equally saturated to its maximum level without allowing excess liquid to be left unabsorbed in the package. The cleaning apparatus, system and method disclosed herein prevents cross-contamination by controlling the amount of cleaning solution/fluid agent and preventing fluid from flowing from pad to pad once all pads are initially saturated with the cleaning solution/fluid agent. As shown in FIGS. 6 through 9A-B, each compartment (3002, 3004, 3006, 3008) of the packaging tray 3000 is further isolated from all the other compartments in order to prevent any transfer of liquid (or other fluids) from one compartment to the other and thereby avoiding any cross-contamination of the packaging system. In alternative embodiments, every compartment (3002, 3004, 3006, 3008) can be loaded with a flexible pouch containing a pre-measured volume of cleaning solution—the volume targeted to provide optimal saturation of all pads within the package—precluding any undersaturation (excessive waste of the cleaning solution) or oversaturation of the cleaning pads.

FIGS. 6 through 9A-B show various embodiments of the cleaning packaging system, including the configuration of the pad with the backer (also referred to as the wiper backer). The packaging system comprises novel and uniquely designed packaging tray assemblies to enable each pad to be snapped onto the tool head without the user touching the pad (hands-free). In alternative embodiments, each pad compartment within the tray 3000 can have alternative shapes (e.g., triangular or other shapes) to correspond to the shape of the pad assembly/tool head, with the compartments configured to allow removal of pads without any hindrance of using the cleaning tool 1000. In the system, apparatus and method disclosed herein and as illustrated in FIGS. 6 through 9A-B, each compartment (3002) within the packaging tray 4000 is generally an asymmetrical trapezoidal-shaped compartment in order to correspond to the shape of the tool head 2000/pad assembly 4000, with each compartment configured to allow hands-free engagement during cleaning operation. Further, each compartment (3002, 3004, 3006, 3008) is designed and configured to be longer than the pad assembly 4000 (along the longitudinal axis of the tool head 2000), such that when a user is returning a pad to a compartment (3002, 3004, 3006, 3008), the user can use the tool 1000 to locate the pad assembly 4000 in a chosen compartment and then slide the tool towards the narrow end of the compartment.

Figure 8:
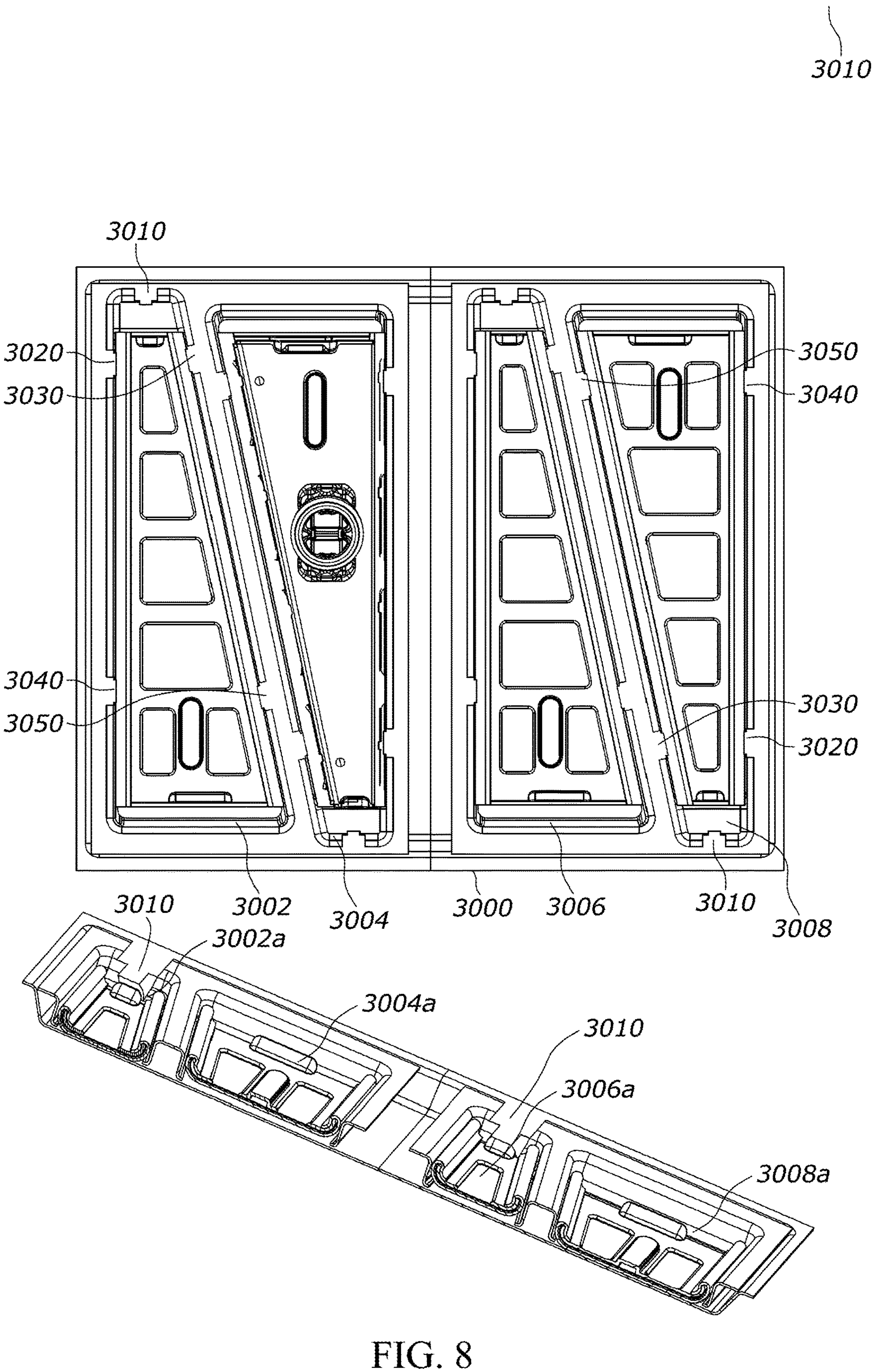
FIG. 8 illustrates an embodiment of the isolator cleaning system, apparatus and method showing a packaging tray comprising a plurality of compartments according to one aspect of the present disclosure.

The innovative packaging tray compartments are designed such that one side of each compartment (3002, 3004, 3006, 3008) is tapered in order to narrow—each compartment having an excess (additional length) on the smaller end than the larger end (as shown in FIGS. 8 and 9A-B)—in such a way as to provide an overhanging rim, ridge, finger or other projection disposed at certain locations along the long edges of the compartment in order to interfere with the pad to facilitate removal thereof during cleaning operation. For each compartment there are a plurality of such overhanging rim, ridge, finger or other projection disposed within the compartment (five shown per compartment in FIGS. 8 and 9A-9B). For instance, there is no engagement or overlap with the projection and the pad assembly in the removal orientation while there is engagement or overlap with the projection and the pad assembly 4000 in the return or used orientation within the compartment. The pad assembly 4000 in 3002 is shown in a position for pad detachment from the tool head. All the three (3) other pads are shown in a position for pad attachment to the tool head. Once the pad assembly 4000 is placed into a position within a compartment under the overhanging projections of the compartment (3002, 3004, 3006, 3008), the unique cut-outs and projections extending from a wall of the compartment (3002, 3004, 3006, 3008) enables the user to pull upward on the tool handle 1000 and the projections of the compartment (3002, 3004, 3006, 3008) engage and retain the pad, allowing the tool 1000 to separate from the pad and leaving the pad in its original compartment. This novel design and configuration of the packaging tray compartments provides the user the ability to engage the pad and load the tool and disengage the pad from the tool without touching the pad in any way (hands-free). Further, each packaging tray 3000 is comprised of a plurality of compartments having a shared fill point to enable fluid to be poured into the common fill point to flow equally across multiple pad assemblies via channels from compartment (e.g., 3002) to compartment (e.g., 3004).

One of the key novel and unique aspects of the packaging system is to provide a place to store and retain soiled pads. Here, the system and methods prevent potential contamination of the base surface around it. Currently available conventional cleaning tools do not provide any means of accommodating soiled pads. The novel system, method and apparatus disclosed herein provides a place for soiled pads that is hands-free, and eliminates a contamination risk factor during the cleaning operation. As shown in FIGS. 6 through 9A-B, the packaging tray 3000 comprises four separate compartments (3002, 3004, 3006, 3008) arranged to enable alignment and hands-free engagement with the asymmetrical trapezoidal tool head 2000 during cleaning operation. As shown, the first compartment and second compartment configured and adapted to receive an asymmetrical trapezoidal tool head 2000 are located in proximity to the side edges of the packaging tray 3000 and at opposite ends of each other. The intermediate compartments are also shaped and adapted to receive an asymmetrical trapezoidal tool head, and are positioned between the first and the second compartments. FIGS. 6 through 9A-B illustrate the detail features of the compartments designed and configured to engage with the asymmetrical tool head frame 2000. As shown, each compartment of the packaging tray 3000 is designed and shaped to be tapered (or narrowed) such that the longitudinal edges of the pad come in contact with the longitudinal edges of the compartment when the pad is positioned at the narrowest end of the compartment and thereby provide interference to the pad edges for removal of the pad from the tool. Further, as illustrated, each compartment of the packaging tray is pre-loaded with pad assembly 4000 (the backer/pad combination) such that there are at least four pad assemblies (4000) in each packaging tray (3002, 3004, 3006, 3008).

In order to provide the user with the correct orientation during the cleaning operation, each compartment can be further marked at each end with indicia such as "Remove pad" and "Used pad." During usage, when the asymmetrical trapezoidal tool head 2000 is positioned above the pad assembly, the user can press the tool head downward towards the base plane of the backer. Next, as the user applies a certain force on the tool head, the curved edges of the rigid backer are designed to flex outward in order for the curved edges of the tool head to pass by the upper edges of the backer and capture and retain the backer—the capture and retention of the backer made effortless by the alignment of the longitudinal edges of the backer with the longitudinal edges of the tool head in the fully assembled position. Further, the engagement of the male protrusions of the backer into the female notches of the tool head keeps the pad assembly contained end to end, preventing any movement of the pad assembly in a longitudinal direction to the tool head once the tool head is fully engaged. For removal, the pad is moved along its longitudinal axis within the compartment to show the "Remove pad" in order to remove the tool with the pad attached. After usage, when the pad is returned to the compartment, the pad is first returned with the "Remove pad" indicia showing and then the pad is moved along its longitudinal axis to reveal the "Used pad" indicia within the compartment. When disposed in this orientation the projections engage the pad and the tool can be removed without much effort from the user while the pad remains in the compartment. Such repeated operation of discarding a used pad and attaching a new pad will enable the user to build muscle memory and bring further efficiency during high-volume cleaning operations.

The apparatus and method disclosed herein provide significant savings related to the usage of fluids by providing only the exact dosage of fluid to properly saturate the number of pads in the package without oversaturation and waste. The hands-free compartment system has a dedicated place for each soiled pad, eliminates the risk of soiled pads coming in contact with anything clean within the process and eliminates a risk factor of cross-contamination by providing a controlled means of containing soiled pads as compared to allowing the user to touch a soiled pad and then subsequently touch a clean pad. The isolator cleaning tool is configured with a means for easy attachment of a cleaning wipe/pad having a minimal amount of textile material. The textile is attached to a rigid backer via mechanical engagement means. The rigid backer has at least one tab on each of the long edges that corresponds to slits or slots in the wipe/pad assembly whereby the tabs are inserted into the corresponding slit/slots on the first edge, then stretched to allow the insertion of the tabs on the opposite edge. A liquid barrier pad attached to the tool head prevents contamination of the tool head from the soaking of any liquid during the cleaning operation. Various forms of soft cushioning pad material can be added behind the wipe to provide the requisite cushioning effect and to maximize surface contact during the cleaning operation. The cleaning tool is sized to certain predetermined form factor and dimensions for easy accessibility of hard-to-reach detail areas of cleaning equipment. The pad assembly 4000 used with the cleaning tool 1000 uses a minimal amount of textile material attached to a rigid backer having a portion of a cylinder on each long edge thereby allowing the backer and wipe assembly to snap onto and off of the tool head frame with light pressure. The backer is further configured with male protrusions on each end that position the pad/wipe assembly on the tool head and thereby provide a touch point facilitating removal of the clean pad/wipe assembly that has not come in contact with soiled surfaces during the cleaning operation.

The cleaning tool can be manufactured using high-heat silicone seals to protect from cross-contamination of the multiple joints (e.g., the joints formed at the handle attachment section of the tool) within the cleaning tool and keep liquid contaminants from inadvertently entering the targeted cleaning environment. In addition, various other engagement means—e.g., snap-in connector mechanism or other mechanism providing equivalent functionality, as disclosed herein—allow the efficient cleaning of a controlled and regulated environment (e.g., an isolator or other controlled and regulated equipment). The novel engagement/disengagement means further allow operators to quickly connect/disconnect various handle segments of the tool for easy and "on-the-fly" length changes during cleaning operations (also shown in FIG. 4A). For instance, quick interchangeable handle sections can be secured to the tool using spring force and/or detents of male into female connectors/receptacles within the tool handle and/or the tool head, providing adequate force to retain the sections in place during use of the tool. The cleaning tool works seamlessly in concert with the packaging tray—providing multiple advantages when compared to prior art isolator (or other similar regulated environment) cleaning tools. For instance, the apparatus, system and methods disclosed herein having the quick-connect/quick-release handle mechanism can further make a hands-free pad attachment/detachment mechanism more efficient by allowing fast and sequential use of the pad assembly within the packaging tray during the cleaning operation. Further, the integrated pad assembly (e.g., pad and backer) eliminates or minimizes touching of soiled pads, preventing cross-contamination and improving tool operational efficiency during cleaning of the equipment, and the usage of minimal textile material prevents any material waste on the top surface of the tool head frame.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

The methods described and disclosed herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. It is understood that the preceding is merely a detailed description of some examples and embodiments of the present disclosure, and that numerous changes to the disclosed embodiments may be made in accordance with the disclosure made herein without departing from the spirit or scope of the disclosure. The preceding description, therefore, is not meant to limit the scope of the disclosure, but to provide sufficient disclosure to allow one of ordinary skill in the art to practice the disclosure without undue burden.

It is further understood that the scope of the present disclosure fully encompasses other embodiments that may become obvious to those skilled in the art. Features illustrated or described as part of one embodiment can be used in another embodiment to yield a still further embodiment. Thus, it is intended that the present disclosure cover such modifications and variations as come within the scope of the appended claims and their equivalents. It is to be understood by one of ordinary skill in the art that the present discussion is a description of exemplary embodiments only, and is not intended as limiting the broader aspects of the present disclosure, which broader aspects are embodied in the exemplary constructions.

The invention claimed is:

1. An apparatus for cleaning a controlled and regulated environment, comprising:

a tray including at least one compartment, a pad assembly and a cleaning solution; wherein the pad assembly and the cleaning solution are disposed in the at least one compartment;

wherein the at least one compartment comprises a first edge opposite a second edge and a first side opposite a parallel second side disposed between the first and the second edge respectively;

wherein the first edge and the second edge are non-parallel to each other;

wherein a tool head frame is complimentarily configured to be disposed within the at least one compartment and comprises a leading edge opposite a trailing edge, wherein the leading edge and trailing edge having a non-parallel configuration;

wherein each of the leading edge and the trailing edge of the tool head frame each have a partial cylinder configuration with a pre-determined radius of curvature configured to be pressed and snap-fitted into the pad assembly during cleaning of the equipment;

wherein the pad assembly comprises a pad, and a backer having curved longitudinal edges complimentary to the curvature of the leading edge and trailing edge and the backer is disposed in the pad;

wherein the pad assembly is movable within one of the plurality of compartments between a first position and a second position so that the tool head frame is hands-free attachable to the pad assembly in the first position or second position and the tool head frame is hands-free detachable from the pad assembly in the second position;

wherein the tool head frame connects to the pad assembly by concentrically aligning and snapping the leading edge and trailing edge of the tool head frame into the curved longitudinal edges of the backer; and wherein the tool head frame is detachable from the pad assembly by moving the pad assembly into the second position so as to overlap an edge of the pad assembly with a plurality of projections extending from a wall of the compartment and lifting the tool head frame such that the plurality of projections engage the pad assembly and retain the pad assembly within the compartment as the pad assembly detaches from the tool head frame.

2. The apparatus of claim 1, further comprising:

a tool handle including a first handle portion removably connected to a second handle portion, the second handle portion pivotably connected to the tool head frame;

wherein the tool head frame further comprises a first side edge opposite a parallel second side edge disposed between the leading edge and the trailing edge respectively.

3. The apparatus of claim 1, wherein the tray provides a place to store and retain used soiled pads.

4. The apparatus of claim 1, wherein each curved longitudinal edge of the backer forms a radiused leading and a trailing edge of the pad when the tool head frame is pressed into the pad assembly during cleaning of the equipment.

5. The apparatus of claim 1, wherein the tool head frame comprises a yoke attachment disposed offset from the center of the tool head frame and centrally located between the first side edge and the second edge of the frame in order to provide additional access during cleaning of the equipment.

6. The apparatus of claim 1, the tool head frame comprises a an integrated hinge mount disposed offset from the center of the tool head frame and centrally located between the first side edge and the second edge of the frame in order to provide additional access and stability during cleaning of the equipment.

7. A cleaning tool comprising:

a tool handle including a first handle portion removably connected to a second handle portion;

a tool head frame pivotably connectable to the second handle portion;

wherein the tool head frame comprises a leading edge opposite a trailing edge and a first side edge opposite a parallel second side edge disposed between the leading and the trailing edge, wherein the leading edge and the trailing edge are non-parallel to each other;

wherein each of the leading edge and the trailing edge of the tool head frame are partially curved and comprise a plurality of notches to form a first fastening component;

a tray including at least one compartment, a pad assembly and a cleaning solution;

wherein the pad assembly and the cleaning solution are disposed in the at least one compartment; and wherein and the pad assembly is movable within the at least one compartment between a first position and a second position so that the tool head frame is hands-free attachable to the pad assembly in the first position or second position and the tool head frame is hands-free detachable from the pad assembly in the second position;

wherein the at least one compartment comprises a first edge opposite a second edge and a first side opposite a parallel second side disposed between the first and the second edge, wherein the first edge and the second edge are non-parallel to each other and configured to complimentarily dispose the tool head frame therein;

wherein the pad assembly comprises a backer, the backer comprising opposite curved longitudinal edges, the opposite curved longitudinal edges comprising a plurality of raised protrusions extending therefrom to form a second fastening component;

wherein tool head frame detachably connects to the pad assembly by press fitting the first fastening component within the second fastening component;

wherein the at least one compartment further includes a projection extending from a wall of the compartment so as to overlap an edge of the pad assembly when disposed in the second position, the projection configured to engage and detach the pad assembly from the tool head frame as a user withdraws the tool head frame from the compartment; and wherein the pad assembly is retained within the compartment when the pad assembly is detached from the tool head frame.

8. The cleaning tool of claim 7, wherein the tool head frame comprises a yoke attachment disposed offset from the center of the tool head frame and centrally located between the first side edge and the second edge of the frame in order to provide additional access during cleaning of the equipment.

9. The cleaning tool of claim 7, the tool head frame comprises an integrated hinge mount disposed offset from the center of the tool head frame and centrally located between the first side edge and the second edge of the frame in order to provide additional access and better stability during cleaning of the equipment.

10. The cleaning tool of claim 7, wherein the pad assembly comprises a pad saturated in the cleaning solution and the backer is disposed within the pad.

* * * * *